United States Patent
Hahn

(10) Patent No.: US 11,945,533 B2
(45) Date of Patent: Apr. 2, 2024

(54) BICYCLE COMPONENT CONTROL

(71) Applicant: SRAM, LLC, Chicago, IL (US)

(72) Inventor: Sage Hahn, Chicago, IL (US)

(73) Assignee: SRAM, LLC, Chicago, IL (US)

( * ) Notice: Subject to any disclaimer, the term of this patent is extended or adjusted under 35 U.S.C. 154(b) by 462 days.

(21) Appl. No.: 17/373,181

(22) Filed: Jul. 12, 2021

(65) Prior Publication Data
US 2023/0013264 A1 Jan. 19, 2023

(51) Int. Cl.
| | |
|---|---|
| *H04L 67/12* | (2022.01) |
| *B62J 1/02* | (2006.01) |
| *B62J 45/20* | (2020.01) |
| *B62M 6/45* | (2010.01) |
| *B62M 6/55* | (2010.01) |
| *B62M 9/06* | (2006.01) |

(52) U.S. Cl.
CPC .............. *B62J 45/20* (2020.02); *B62J 1/02* (2013.01); *B62M 6/45* (2013.01); *B62M 6/55* (2013.01); *B62M 9/06* (2013.01); *H04L 67/12* (2013.01)

(58) Field of Classification Search
None
See application file for complete search history.

(56) References Cited

U.S. PATENT DOCUMENTS

| | | | |
|---|---|---|---|
| 5,870,381 A | 2/1999 | Kawasaki et al. | |
| 6,023,646 A | 2/2000 | Kubacsi et al. | |
| 6,204,775 B1 | 3/2001 | Kubacsi | |
| 6,623,389 B1 | 9/2003 | Campagnolo | |
| 7,274,907 B1 | 9/2007 | Perotti et al. | |
| 7,623,931 B2 | 11/2009 | Campagnolo | |
| 7,704,173 B2 | 4/2010 | Ichida et al. | |
| 8,721,495 B2 | 5/2014 | Kitamura et al. | |
| 8,874,338 B2 | 10/2014 | Miglioranza | |
| 8,918,665 B2 | 12/2014 | Low | |
| 2005/0143145 A1 | 6/2005 | Maekawa | |
| 2005/0255831 A1 | 11/2005 | Kato et al. | |
| 2008/0312799 A1* | 12/2008 | Miglioranza | B62M 25/08 701/66 |
| 2009/0102628 A1 | 4/2009 | Takebayashi | |
| 2009/0240858 A1 | 9/2009 | Takebayashi | |
| 2009/0315692 A1 | 12/2009 | Miki et al. | |

(Continued)

FOREIGN PATENT DOCUMENTS

| | | |
|---|---|---|
| EP | 1759971 | 3/2007 |
| EP | 2399813 | 12/2011 |

*Primary Examiner* — Ryan Rink

(57) ABSTRACT

An electrically actuated component of a bicycle includes a first controller configured to receive a data stream from a second controller. The data stream includes one or more packets received by the first controller. For each of the one or more packets received by the first controller, the first controller is configured to identify a number of the one or more packets of the data stream received by the first controller, and compare the identified number of packets to a predetermined threshold number of packets. After all packets of the one or more packets of the data stream have been received by the first controller, the first controller is configured to initiate, based on the respective comparison, an action of the electrically actuated component or another electrically actuated component of the bicycle when the identified number of packets is less than the predetermined threshold number of packets.

20 Claims, 24 Drawing Sheets

(56) References Cited

U.S. PATENT DOCUMENTS

| | | |
|---|---|---|
| 2010/0112950 A1 | 5/2010 | Haartsen et al. |
| 2010/0214222 A1 | 8/2010 | Yen |
| 2011/0045875 A1 | 2/2011 | Rhee |
| 2011/0320093 A1* | 12/2011 | Kitamura ............... B62M 25/08 |
| | | 701/1 |
| 2012/0035011 A1 | 2/2012 | Menachem |
| 2016/0339986 A1 | 11/2016 | Jordan et al. |
| 2018/0257736 A1 | 9/2018 | Komatsu et al. |
| 2020/0052773 A1* | 2/2020 | Go .......................... H04L 67/12 |

* cited by examiner

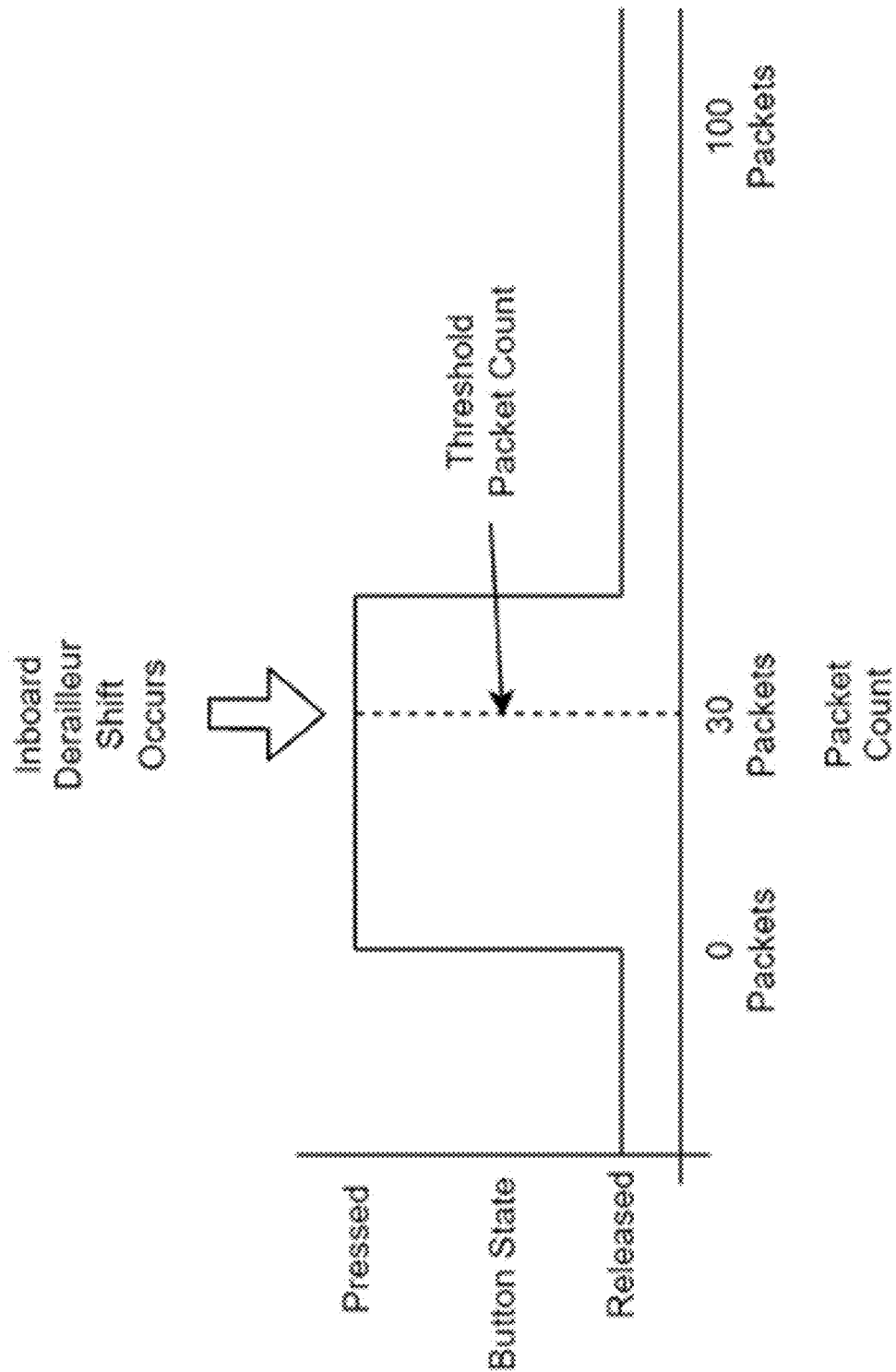

BICYCLE COMPONENT CONTROL

BACKGROUND

1. Field of the Disclosure

The present disclosure is generally directed to control of bicycle components, and more particularly, to control of electrically actuated bicycle components.

2. Description of Related Art

For bicycle electronic shifting systems, electronic bicycle systems, bicycle suspension systems, and electronic seat post systems, one or more electronic controllers are placed on the bicycle handlebar and/or another rider accessible location on the bicycle or elsewhere. The one or more electronic controllers each include one or more buttons and/or levers (e.g., buttons).

For a bicycle that includes a number of electrically actuated components, each with a number of actions controlled by, for example, one or more buttons, a number of buttons corresponding to the number of electrically actuated components or the number of controlled actions may be included on and/or off the bicycle.

SUMMARY

In one example, an electrically actuated component of a bicycle includes a first controller configured to receive a data stream from a second controller. The data stream includes one or more packets received by the first controller. The first controller is further configured to, for each of the one or more packets received by the first controller, identify a number of the one or more packets of the data stream received by the first controller, and compare the identified number of packets to a predetermined threshold number of packets. The first controller is further configured to, after all packets of the one or more packets of the data stream have been received by the first controller, initiate, based on the respective comparison, an action of the electrically actuated component or another electrically actuated component of the bicycle when the identified number of packets is less than the predetermined threshold number of packets.

In one example, the one or more packets are one or more first packets. The data stream further includes one or more second packets received by the first controller periodically, after the one or more first packets.

In one example, the one or more first packets are a first type of packets generated by the second controller in response to actuation of a control device of the bicycle, and the one or more second packets are a second type of packets generated by the second controller after the control device is released. The first type of packets is different than the second type of packets in that the first type of packets includes data that identifies the control device actuation and the second type of packets includes data that identifies the control device release.

In one example, the initiation of the action includes initiation of the action of the electrically actuated component or the other electrically actuated component after a second packet of the one or more second packets is received by the first controller.

In one example, the electrically actuated component is a rear derailleur.

In one example, the electrically actuated component further includes a motor in communication with the first controller. The initiation of the action includes actuation of the motor, such that the rear derailleur executes a first gear shift in one direction of an outboard direction and an inboard direction.

In one example, the other electrically actuated component is a first other electrically actuated component, and the action is a first action of the electrically actuated component or a first action of the first other electrically actuated component. The first controller is further configured to initiate, based on the respective comparison, a second action when the identified number of packets is equal to the predetermined threshold number of packets. The second action is a second action of the electrically actuated component, a second action of the first other electrically actuated component, or a first action of a second other electrically actuated component.

In one example, the initiation of the second action includes actuation of the motor, such that the rear derailleur executes a second gear shift. The second gear shift is in the other direction of the outboard direction and the inboard direction.

In one example, the first controller is further configured to actuate, based on the respective comparison, the motor when the identified number of packets is equal to a second multiple of the predetermined threshold number of packets, such that the rear derailleur executes a third gear shift, the third gear shift being in the other direction.

In one example, wherein the first other electrically actuated component is a front derailleur. The initiation of the second action includes actuation of a motor of the front derailleur, such that the front derailleur shifts chainrings of the bicycle.

In one example, the first other electrically actuated component is a seat post assembly of the bicycle. The initiation of the second action includes actuation of a valve of the seat post assembly, such that the valve opens and a height of a seat post of the seat post assembly is changeable.

In one example, the first controller is further configured to close the valve of the seat post assembly after a second packet of the one or more second packets is received by the first controller.

In one example, the first other electrically actuated component is a suspension assembly of the bicycle. The initiation of the second action includes actuation of a damper of the suspension assembly, such that a rigidity of the suspension assembly is changed.

In one example, the identification of the number of the one or more packets of the data stream received by the first controller includes identification of the number of the one or more packets of the data stream received by the first controller within data of the respective packet, the first controller is further configured to count each of the one or more packets of the data stream as the one or more packets are received by the first controller, and the identification of the number of the one or more packets of the data stream received by the first controller includes identification of the number of the one or more packets of the data stream received by the first controller based on the count, or a combination thereof.

In one example, a method for controlling one or more electronic components of a bicycle includes receiving, by a controller of the bicycle, a packet of a data stream, identifying, by the controller, a number of packets of the data stream received by the controller, and comparing, by the controller, the identified number of packets to a predetermined threshold number of packets. The method further includes repeating, by the controller, the receiving, the identifying, and the comparing one or more times. The repeating includes repeating the receiving, the identifying, and the comparing until all the packets of the data stream have been received by the controller. After all of the packets of the data stream have been received by the controller, the method further includes controlling, by the controller, based on the respective comparing, an electronic component of the one or more electronic components of the bicycle when the identified number of packets is less than the predetermined threshold number of packets, such that a first action of the electronic component is executed.

In one example, the electronic component is a first electronic component. The method further includes controlling, based on the respective comparing, the first electronic component when the identified number of packets equals the predetermined threshold number of packets, such that a second action of the first electronic component is executed, or controlling, based on the respective comparing, a second electronic component of the one or more electronic components of the bicycle when the identified number of packets equals the predetermined threshold number of packets, such that a first action of the second electronic component is executed.

In one example, the packets are first packets. Each of the first packets is a first type of packet that identifies actuation of a control device of the bicycle. The method further includes receiving, by the controller, one or more second packets of the data stream after all of the first packets have been received by the first controller. Each of the second packets is a second type of packet that identifies release of the control device. Receiving the one or more second packets of the data stream includes receiving a predetermined number of second packets or receiving a number of second packets less than the predetermined number of second packets. When the number of second packets less than the predetermined number of second packets is received, the method further includes receiving third packets after all of the second packets have been received. Each of the third packets is the first type of packet.

In one example, when the controller receives the number of second packets less than the predetermined number of second packets and receives the third packets, the method further includes determining, by the controller, a time between a last received first packet of the first packets and a first received third packet of the third packets, comparing, by the controller, the determined time to a predetermined threshold time, and controlling, based on the comparing of the determined time to the predetermined threshold time, the second electronic component when the determined time is less than the predetermined threshold time, such that the first action of the second electronic component is repeated.

In one example, the electronic component is a first electronic component. The method further includes for each of the one or more second packets, identifying, by the controller, a number of second packets of the data stream received by the controller, and comparing, by the controller, the identified number of second packets to the predetermined number of second packets. The method further includes, after all second packets of the one or more second packets have been received by the controller, controlling, by the controller, based on the respective comparing of the identified number of second packets to the predetermined number of second packets, a second electronic component of the one or more electronic components of the bicycle when the identified number of second packets is less than the predetermined number of second packets, such that a first action of the second electronic component is executed.

In one example, in a non-transitory computer-readable storage medium that stores instructions executable by one or more processors to control one or more electronic components of a bicycle, the instructions include receiving a packet of a data stream, identifying a number of packets of the data stream received by the controller, and comparing the identified number of packets to a predetermined threshold number of packets. The instructions further include repeating the receiving, the identifying, and the comparing one or more times. The repeating includes repeating the receiving, the identifying, and the comparing until all the packets of the data stream have been received. The instructions further includes, after all of the packets of the data stream have been received, controlling, based on the respective comparing, an electronic component of the one or more electronic components of the bicycle when the identified number of packets is less than the predetermined threshold number of packets, such that a first action of the electronic component is executed.

BRIEF DESCRIPTION OF THE DRAWINGS

Objects, features, and advantages of the present invention will become apparent upon reading the following description in conjunction with the drawing figures, in which:

FIG. 6A is a plot of button state over number of packets generated and transmitted for a first example of an extended button press;

Other aspects and advantages of the embodiments disclosed herein will become apparent upon consideration of the following detailed description, wherein similar or identical structures have similar reference numerals.

DETAILED DESCRIPTION OF THE DISCLOSURE

Figure 1A:
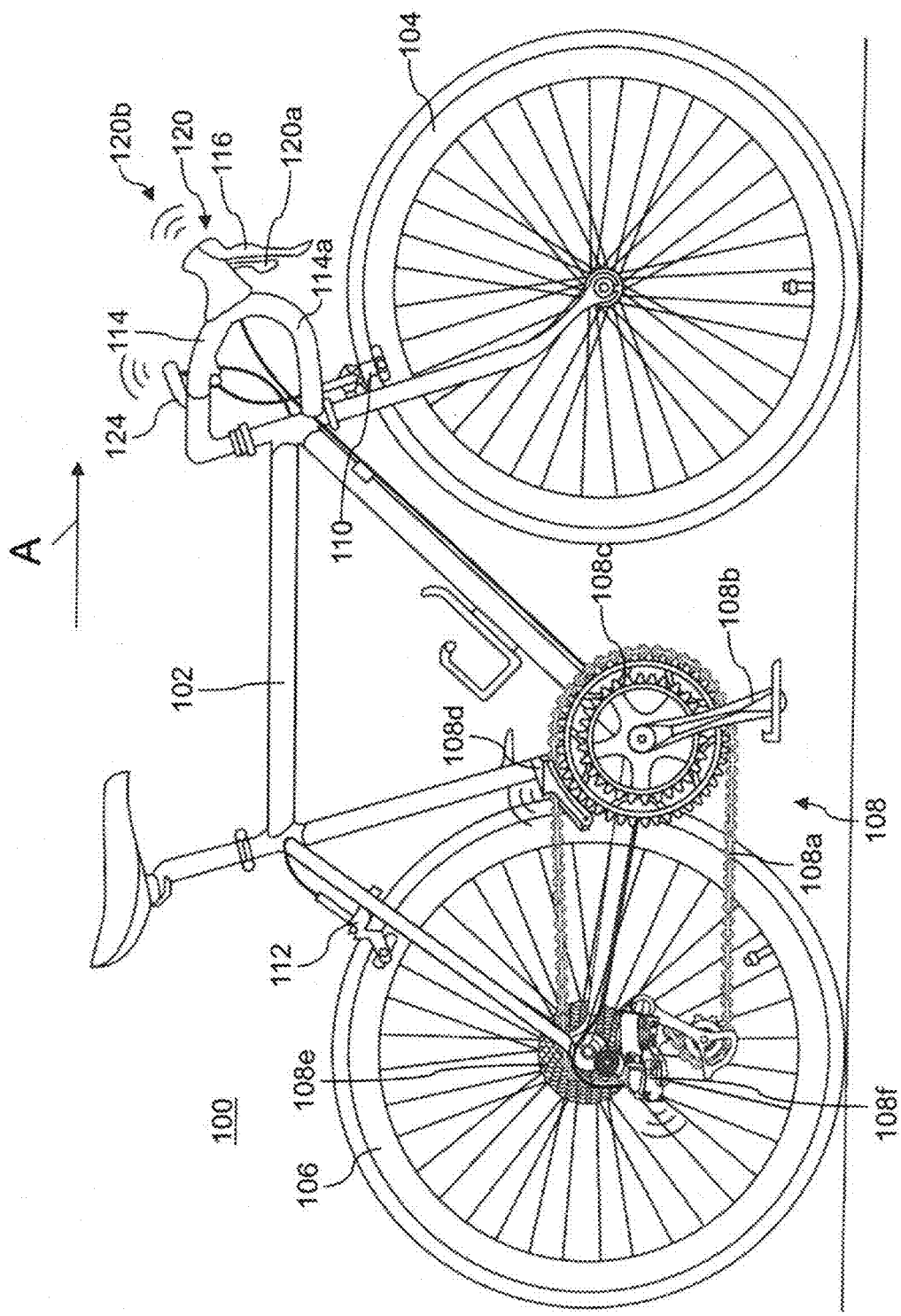
FIG. 1A is a right-side view of an example road bicycle that may implement aspects of the present disclosure.

Each button press and/or each combination of button presses causes a reaction by another device on the bicycle such as, for example, a rear derailleur inboard shift, a rear derailleur outboard shift, or a front derailleur position toggle. In the case of the rear derailleur, a press and hold of a button associated with the rear derailleur may cause multiple shifts at some time interval until the button is released. Other buttons may have one function when the button is pressed and another function when the button is released. For example, a valve of a seat post may be opened when a button is pressed, which allows the seat post to be compressed or extended, and the valve of the seat post may be closed when the button is released, which locks the seat post in a position.

Multiple functions may be assigned to a single button, as some button locations on the bicycle are ergonomically superior for the rider, and an increase of the number of buttons in these ergonomically superior locations may be undesirable due to the rider not being able to determine which button is pressed without looking at the buttons. The present disclosure provides examples of bicycle component control that solve or improve upon one or more of the above-noted and/or other disadvantages with prior known bicycle component control. The disclosed bicycle component control uses an abbreviated button press to initiate one action and an extended button press to initiate another action.

When a button on an electronic controller is pressed by a rider, for example, the electronic controller begins transmitting individual messages or data packets indicating that a button has been pressed (e.g., first packets). The electronic controller may continue to transmit the data packets periodically until the button is released. When the button is released, the electronic controller may send additional packets. For example, the electronic controller sends a number of packets indicating that the button has been released (e.g., second packets). The number of packets sent after release may be predetermined, or adjusted based on other operating parameters.

The electronic controller may generate and/or send packets periodically, or randomly, in reaction to the press or release of the button, and the character thereof.

By sending release packets, receiving devices may identify that the button was released and not that a packet was simply not received. This allows receiving devices to act rapidly to button state changes without having to account for possible packet loss. Each packet for a given button transition contains information about which button or buttons were pressed, a global rolling code, and/or a packet index or counter indicating a number of packets sent for a corresponding event, in addition to other data.

The receiving device (e.g., a rear derailleur) may determine the character of the button press based on an indication number of first packets sent to the receiving device. For example, as each first packet is received by the receiving device, a processor of the receiving device may identify a number of the first packets that has been received by the receiving device and compares the identified number of the received first packets to a predetermined threshold number of packets. After all of the first packets have been received by the receiving device (e.g., as indicated by receipt of a first of the second packets), if, based on a most recent comparison, the identified number of the received packets is less than the predetermined threshold number of packets, the processor of the receiving device may initiate a first action of the receiving device (e.g., an outboard shift of the rear derailleur) or another electronic component of the bicycle. In other words, the processor identifies an abbreviated button press and initiates an action of an electronic component of the bicycle, which is assigned to the abbreviated button press.

Alternatively, or additionally, the receiving device may determine an indication of the number of packets generated through the packet index or other information contained in received packets.

Through the identification of an indication of a number of transmitted packets a receiving device may establish and/or otherwise determine actions to be taken based on a number of transmitted packets, regardless of any consideration of time.

While receiving the first packets, if, based on the respective comparison, the identified number of the received packets is equal to the predetermined threshold number of packets, the processor of the receiving device may initiate a second action of the receiving device (e.g., an inboard shift of the rear derailleur), a second action of the other electronic component, or a first action of yet another electronic component of the bicycle. In other words, the processor identifies an extended button press based on the identified number of the received packets and initiates another action of the electronic component or an action of another electronic component of the bicycle, which is assigned to the extended button press.

A significant advantage of the disclosed bicycle component control is that the reduction of the number of buttons within the ergonomically superior locations on the bicycle facilitates the user being able to determine which button is pressed without looking at the buttons, which is important for safety. Another advantage of the disclosed bicycle component control is that buttons add complexity and cost to a controller component and combining functions on fewer buttons retains functionality on a low button count system, which reduces cost and complexity.

Wireless communication between components is described herein. Although the present specification describes components and functions that may be implemented in particular wireless communication embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

In an embodiment, components of the bicycle described herein will communicate with each other. In the case of wireless communication, the components will initially be paired so as to allow secure communication between components on the bicycle without interference from devices not associated with the system. One or more of the components may also be paired with a separate device like a computer, tablet, or phone (e.g., a mobile device). This paired device may provide the user interface to allow the user to communicate with the components on the bicycle. Examples of communication are updating firmware, setting variables, and running diagnostic tools and analysis.

In an embodiment, an action may be initiated or taken by a device based on an identification of a number of wireless communication packets generated and/or transmitted due to a button press. The device taking the action receives the indication through a wireless communication. For example, a wireless receiving device may be configured to analyze received wireless communication packets for information contained within the packet that indicates the number of packets generated and/or transmitted. This information may be a code contained in the packet that is increased, or otherwise indexed, with each successive packet generated and/or transmitted. The receiving device may analyze the code for an indicated value within a range of acceptable values, and take an action based on identifying such an in-range value. In another example the packet generating device may maintain a record of how many packets are generated, and information indicating that number may be sent in a separate packet.

FIG. 1A illustrates a right side view of an example road bicycle 100. The bicycle 100 includes a frame 102, a front wheel 104, a rear wheel 106, and a drivetrain 108. The front wheel 104 and the rear wheel 106 are rotatably coupled to the frame 102. The bicycle 100 includes a front brake 110 for braking the front wheel 104 and a rear brake 112 for braking the rear wheel 106. To allow a user to steer the bicycle 100, the bicycle 100 includes a handlebar assembly 114 attached to the frame 102.

Figure 1B:
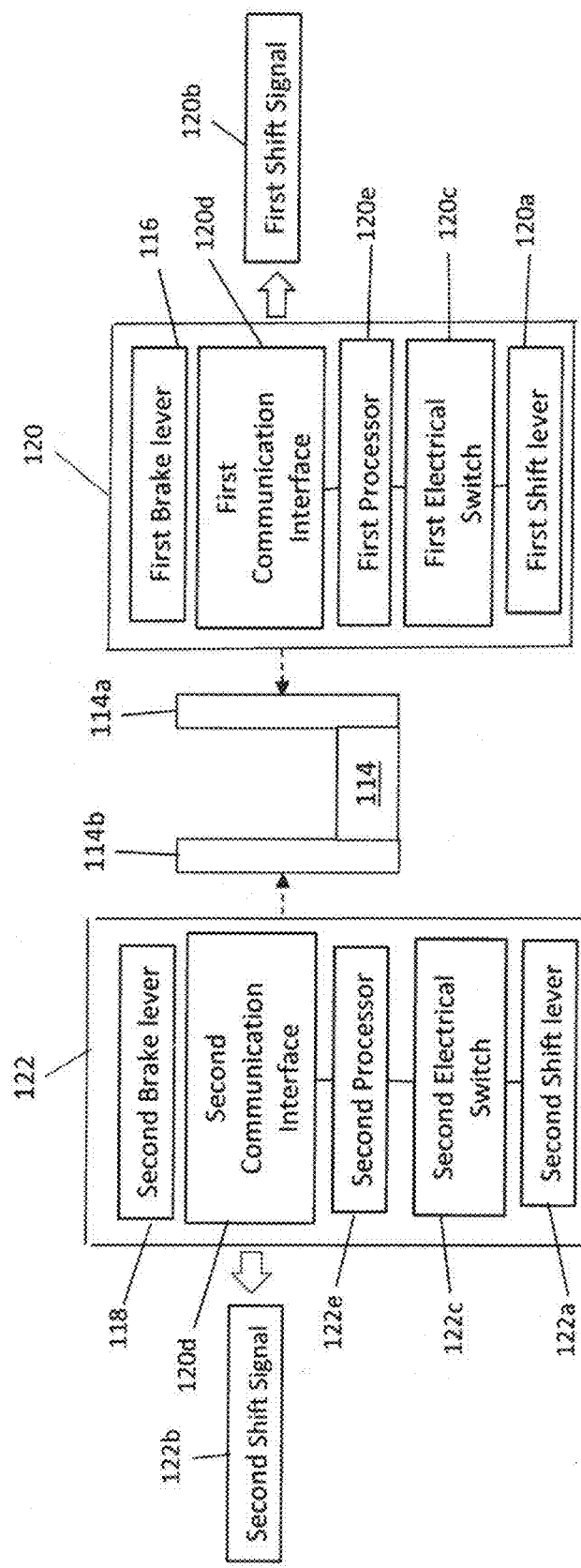
FIG. 1B is a schematic diagram of a handlebar assembly of the example road bicycle shown in FIG. 1A, and other components coupled to the handlebar assembly.

FIG. 1B illustrates a schematic diagram depicting the handlebar assembly 114 and other components coupled to the handlebar assembly 114. As shown in FIG. 1A and/or FIG. 1B, the handlebar assembly 114 includes a right drop bar 114a and a left drop bar 114b to accommodate the right hand and the left hand of the user, respectively. The bicycle 100 includes a first or right controller device 120 coupled to the right drop bar 114a. The first controller device 120 includes a first or right brake lever 116 to allow the user to operate the rear brake 112. Correspondingly, the bicycle 100 includes a second or left controller device 122 coupled to the left drop bar 114b. The second controller device 122 includes a second or left brake lever 118 to allow the user to operate the front brake 110.

Figure 1C:
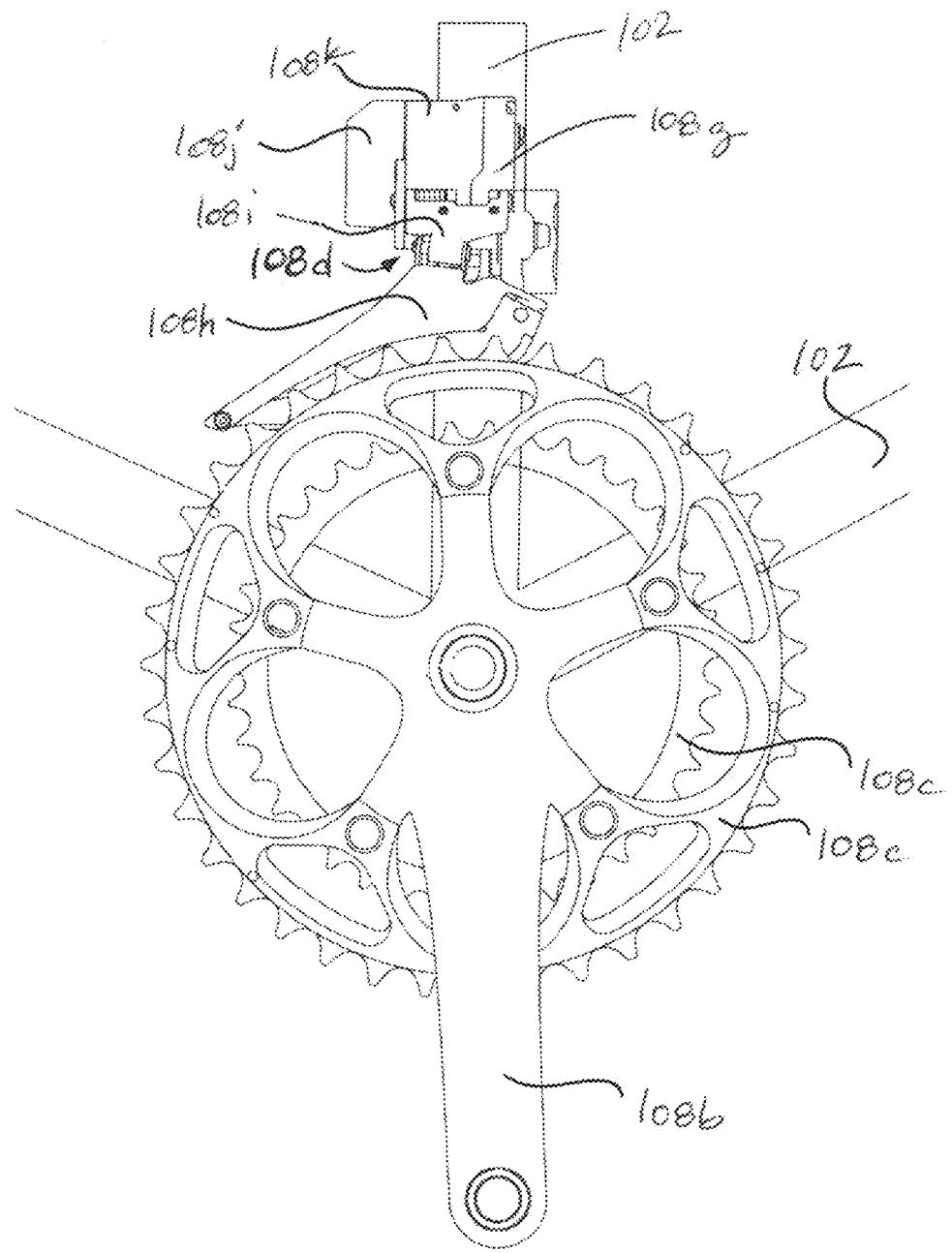
FIG. 1C is a side view of a front derailleur of the example road bicycle shown in FIG. 1.
Figure 1D:
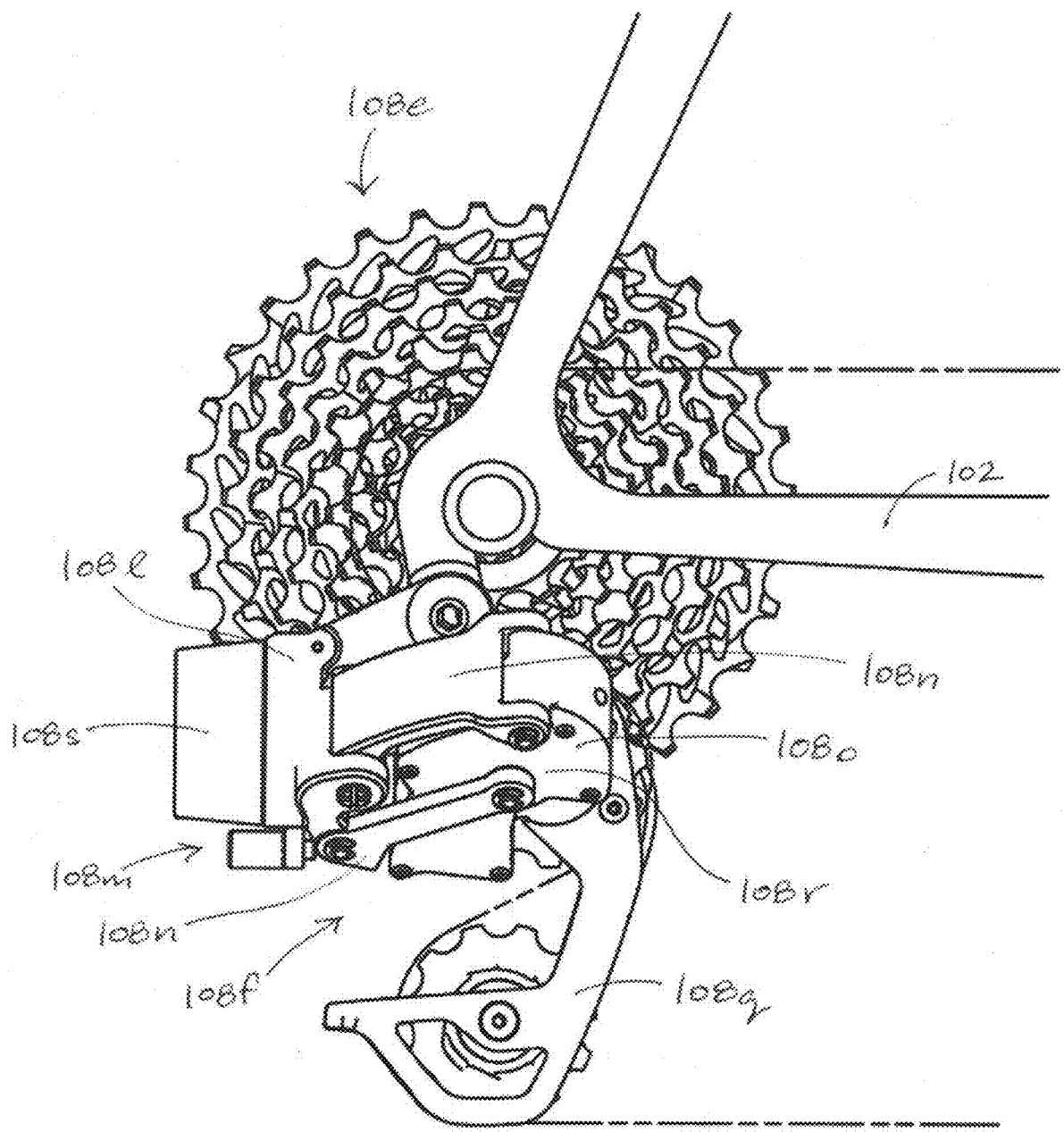
FIG. 1D is a side view of a rear derailleur of the example road bicycle shown in FIG. 1.

As shown in FIGS. 1A, 1C, and 1D, the drivetrain 108 includes a drive chain 108a, a front crank 108b, front chainrings 108c, a front gear changer such as an electromechanical front derailleur 108d, rear sprockets 108e, and a rear gear changer such as an electromechanical rear derailleur 108f. The front chainrings 108c are coupled to the front crank 108b. Diameters and numbers of teeth on the front sprockets 108c may differ from each other. The rear sprockets 108e are coaxially mounted to the rear wheel 106. Diameters and numbers of teeth on the rear sprockets 108e may decrease from left to right. Alternatively, the diameters and the numbers of teeth on the rear sprockets 108e may decrease from right to left. The chain 108a engages a selected chainring 108c and a selected sprocket 108e.

To drive the bicycle 100, the user may pedal to rotate the front crank 108b relative to the frame 102. Rotation of the front crank 108b causes the selected chainring 108c to rotate and the chain 108a to move through the drivetrain 108. Movement of the chain 108a causes corresponding rotation of the selected sprocket 108e and thus the rear wheel 106. Rotation of the rear wheel 106 against the ground may propel the bicycle 100 in a forward direction. The front and/or forward orientation and movement of the bicycle 10 is indicated by the direction of arrow "A." Further, other terms relating to direction may be used herein. For example, the "inboard" and "outboard," and "left" and "right" may be used. The terms "right" and "left," and "inboard" and "outboard" describe a position between parts or items and a vertical plane substantially bisecting the bicycle or a direction toward or away from the vertical plane substantially bisecting the bicycle. Moreover, terms such as "front" and "rear" referred to bicycle mechanisms conventionally mounted to the bicycle and with the bicycle oriented in the forward direction.

The selected chainring 108c and the selected sprocket 108e, in combination, determine a gear ratio for driving the bicycle 100. Operation of the front derailleur 108d allows the user to change the selected chainring 108c engaged by the chain 108a. for example, the front derailleur 108d may be actuated to shift the chain 108a left or right from one chainring 108c to the other. The front derailleur 108d is shown as a wireless electrically-actuated front derailleur mounted to the frame 102. The front derailleur 108d may include a base member 108g mounted to the bicycle frame 102 and a chain guide assembly 108h or cage movably connected to the base member 108g by a front linkage 108i in the form of a parallelogram. A front power supply 108j (e.g., a removable battery) may be mounted on the front derailleur 108d. The front power supply 108j may supply power to a front motor unit 108k. The front motor unit 108k is configured to supply torque to the components of the front derailleur 108d to move the chain guide assembly 108h relative to the front base member 108g such that the front derailleur 108d may shift the chain 108a between the front sprockets 108c.

Operation of the rear derailleur 108f allows the user to change the selected sprocket 108e engaged by the chain 108a. For example, the rear derailleur 108f may be actuated to shift the chain 108a left or right from one sprocket 108e to another. The rear derailleur 108f is shown in FIGS. 1A and 1D as a wireless electrically-actuated rear derailleur mounted to the frame 102. The rear derailleur may include a base member 108l (e.g., a b-knuckle) that is mounted to the bicycle frame 102. A linkage 108m may include two links 108n that are pivotally connected to the base member 108l. A movable member 108o (e.g., a p-knuckle) may be connected to the linkage 108m. A chain guide assembly 108q or cage may be configured to engage and maintain tension in the chain 108a and may be pivotally connected to a part of the movable member 108o.

A motor unit 108r and rear power supply 108s (e.g., a removable battery) are disposed on the rear derailleur 108f. The battery 108s supplies power to the motor unit 108r. In this embodiment, the motor unit 108r is disposed in the movable member 108o. Alternatively, the motor unit 108r may be disposed in one of the links 108n or in the base member 108l. The motor unit 108r may include a motor and a gear transmission. The motor unit 108r may be coupled with the linkage 108m to laterally move the cage 108q and thus shift the chain 108a among the rear sprockets 108e.

Figure 1E:
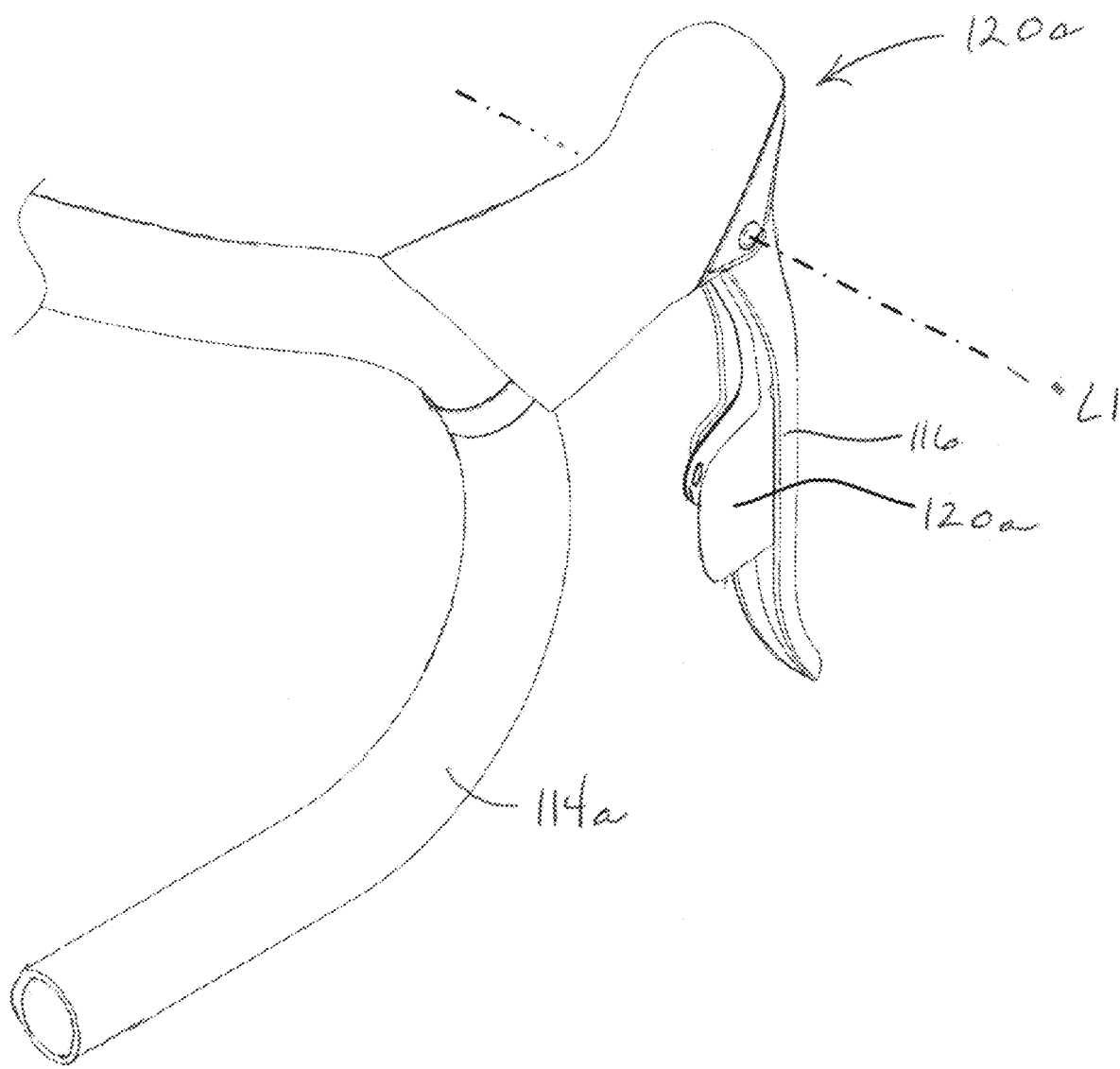
FIG. 1E is a side view of a right controller device of the example road bicycle shown in FIG. 1A coupled to a right drop bar.

Looking to FIGS. 1A, 1B, and 1E, to allow the user to operate the front derailleur 108d or the rear derailleur 108f, the first controller device 120 and the second controller device 122 include a first electrical switch 120c and a second electrical switch 122c, respectively. The first electrical switch 120c and the second electrical switch 122c are actuated by a first input element and a second input element, respectively (e.g., the first shift lever 120a and the second shift lever 122a, respectively). The first shift lever 120a is configured to receive a right input from the right hand of the user and actuate the first electrical switch 120c. The second shift lever 122a is configured to receive a left input from the left hand of the user and actuate the second electrical switch 122c. The first shift lever 120a may be positioned behind to the first brake lever 116, while the second shift lever 122a may be positioned behind the second brake lever 118.

To provide the right input to the first shift lever 120a, the user may manually apply pressure on the right side of the first shift lever 120a. In response, the first shift lever 120a may pivot about a first shift lever axis L1 from an initial rest position to a shift actuation position. The first shift lever 120a may be biased with a spring or the like so that when the manual pressure is no longer applied by the user, the first shift lever 120a returns to the initial rest position. Similarly, to provide the left input to the second shift lever 122a, the user may manually apply pressure on the left side of the second shift lever 122a. In response, the second shift lever 122a may pivot about a second shift lever axis L2 (not shown) from an initial rest position to a shift actuation position. The second shift lever 122a may be biased with a spring or the like so that when the manual pressure is no longer applied by the user, the second shift lever 122a returns to the left starting position.

The first controller device 120 and the second controller device 122 include a first controller processor 120e and a second controller processor 122e, respectively, that electronically process the manual input received by the first shift lever 120a and the second shift lever 122a, respectively. For example, the right input triggers a first controller communication interface 120d to wirelessly send a first shift signal 120b, and the left input triggers a second controller communication interface 122d to wirelessly send a second shift signal 122b. Correspondingly, the front derailleur 108d and the rear derailleur 108f include communication interfaces and processors that are configured to receive and electronically process the first shift signal 120b and/or the second shift signal 122b to determine a designated response.

In a first scenario, the user provides the right input via the first shift lever 120a but does not provide the left input via the second shift lever 122a. In response, the first controller device 120 sends the first shift signal 120b, while the left controller device 122 sends no signal. When the rear derailleur 108f receives the first shift signal 120b with no second shift signal 122b, the rear derailleur 108f shifts the chain 108a to engage the next smaller sprocket 108e to the right or performs a downshift. Meanwhile, when the front derailleur 108d receives the first shift signal 120b with no second shift signal 122b, the front derailleur 108d remains idle.

In a second scenario, the user provides the left input via the second shift lever 122a but does not provide the right input via the right shift lever 120a. In response, the second controller device 122 sends the second shift signal 122b, while the first controller device 120 sends no signal. When the rear derailleur 108f receives the second shift signal 122b with no first shift signal 120b, the rear derailleur 108f shifts the chain 108a to engage the next larger sprocket 108e to the left or performs a upshift. Meanwhile, when the front derailleur 108d receives the second shift signal 122b with no second shift signal 120b, the front derailleur 108d remains idle.

In some embodiments, the user may manually apply pressure to the first shift lever 120a and/or the second shift lever 122a for an extended button press resulting in a number of packets being generated and transmitted. For example, without applying pressure to the second shift lever 122a, the user may apply continuous pressure to keep the first shift lever 120a in the left final position, such that the number of packets being generated and transmitted exceeds a threshold number of packets, e.g., thirty packets. In response, the first controller device 120 sends the first shift signal 120b until, for example, the user releases the pressure on the first shift lever 120a. When the rear derailleur 108f receives the first shift signal 120b, the rear derailleur 108f determines, for example, that the first shift signal 120b exceeds the threshold number of packets. In response, rather than merely shifting the chain 108a to engage the next sprocket 108e to the right (e.g., outboard relative to the frame 102 of the bicycle 100), the rear derailleur 108f shifts the chain 108a repeatedly over multiple sprockets 108e to the right until the user releases the pressure on the first shift lever 120a and the first shift signal 120b ceases, or until the chain 108a reaches the right-most sprocket 108e. Alternatively, to shift the chain 108a repeatedly over multiple sprockets 108e to the left, the user may apply continuous pressure to the left shift lever 122a, such that the number of packets being generated and transmitted exceeds the threshold number of packets.

As shown in FIGS. 1A and 1B, the first controller device 120 and the second controller device 122 employ the first shift lever 120a and the second shift lever 122a as respective input elements to generate corresponding wireless shift signals 120b, 122b to actuate the front derailleur 108d and the rear derailleur 108f. Alternative embodiments, however, may include controller devices with different configurations to control a front derailleur and/or a rear derailleur. For example, a bicycle may include aerobars with pushbuttons instead of drop bars with shift levers, where the pushbuttons act as input elements that may be pressed by the user to generate wireless signals that may be received and processed by the front derailleur and the rear derailleur. Also, while some controller devices may be coupled to handlebar assemblies, other controller devices may be coupled to other areas of a bicycle, such as locations throughout the frame. Further, other types of controller devices are contemplated. For example, a unified shifter device may be employed, where the user may press one or more pushbuttons on a mounted box to send signals that control the front derailleur and/or the rear derailleur. Alternatively, a pedal sensor may be employed to receive input from the user via pedaling action by the user, and the front derailleur and/or the rear derailleur may respond to a signal from the pedal sensor (e.g., select gears to maintain a desired cadence or pedal resistance).

Figure 2A:
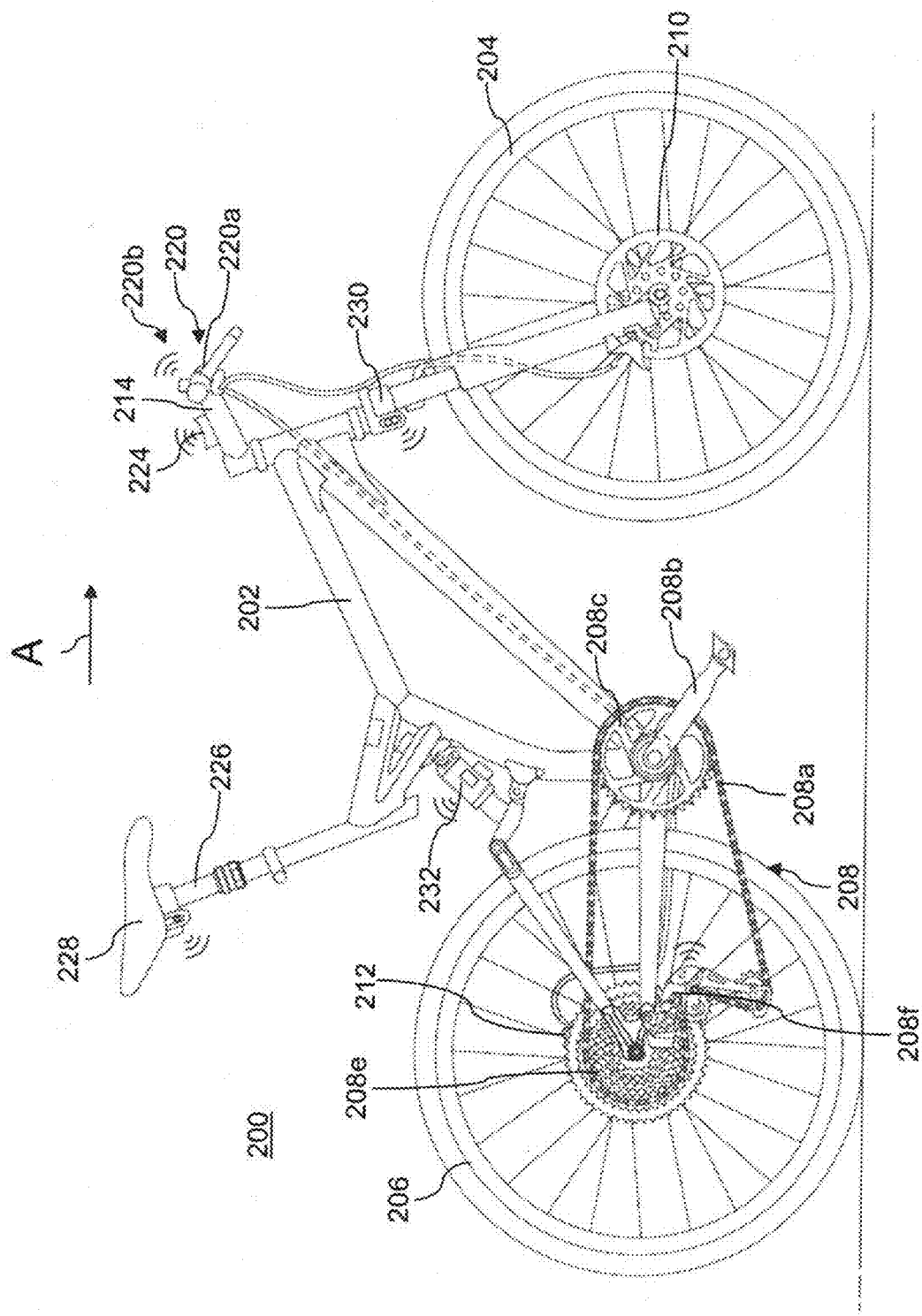
FIG. 2A is a right-side view of an example mountain bicycle that may implement aspects of the present disclosure.

While the example bicycle 100 shown in FIGS. 1A and 1B is a road bicycle, aspects of the present disclosure may be implemented with bicycles of any type. For example, FIG. 2A illustrates a right side view of an example mountain bicycle 200. In some cases, the bicycle 200 may be an e-bike. The bicycle 200 includes a frame 202, a front wheel 204, a rear wheel 206, a drivetrain 208, front disk brakes 210, and rear disk brakes 212. The drivetrain 208 includes a chain 208a, a front crank 208b, a front chainring 208c, rear sprockets 208e, and a rear derailleur 208f, which operate in a manner similar to the corresponding components of the drivetrain 108 described above.

In contrast to the bicycle 100, the bicycle 200 includes other operating-enacting devices such as a height-adjustable seat post assembly 226, and a front suspension system 230 (e.g., a front suspension assembly) and a rear suspension system 232 (e.g., a rear suspension assembly). In FIGS. 2A and 2C, the seat post assembly 226 in shown as a wireless, electrically-actuated seat post assembly 226 that allows a position of a seat 228 (e.g., a saddle) to be dynamically adjusted. For example, the adjustable seat post 226 may include an operable valve (not shown) that allows the seat 228 to be dropped to a lower height during a ride to change the position of the user (e.g., a rider) relative to the frame 202 and achieve better handling. The seat post assembly 226 includes a first or lower tube 226a and a second or upper tube 226b (e.g., two tubes). The two tubes 226a, 226b are movable relative to each other to establish a height of the seat 228 relative to the frame 202. A head 226c is fixed to a top of the second tube 226b. A seat post motor unit 226d is mounted to the head 226c, and a power supply 226e (e.g., a removable battery) is attached to the motor unit 226d. The motor unit 226d may include a motor and a gear transmission. The seat post power supply 226e may supply power to the seat post motor unit 226d. The seat post motor unit 226d is configured to supply torque to the components of the seat post assembly 226 to open and close the operable valve.

The front suspension system is shown as a wireless, electrically-actuated front suspension system 230 that allows the suspension characteristics at the front wheel 204 to be dynamically adjusted. Further, the rear suspension system is shown as a wireless, electrically-actuated rear suspension system 232 that allows suspension characteristics at the rear wheel 206 to be dynamically adjusted. The front suspension system 230 and the rear suspension system 232 may further include power supplies such as batteries that supply power to a front suspension motor unit and a rear suspension motor unit, respectively. The front suspension motor unit and the rear suspension motor unit may be configured to supply torque to the components of the front suspension system 230 and the rear suspension system 232, respectively, to open and close one or more valves to change various suspension characteristics.

Figure 2B:
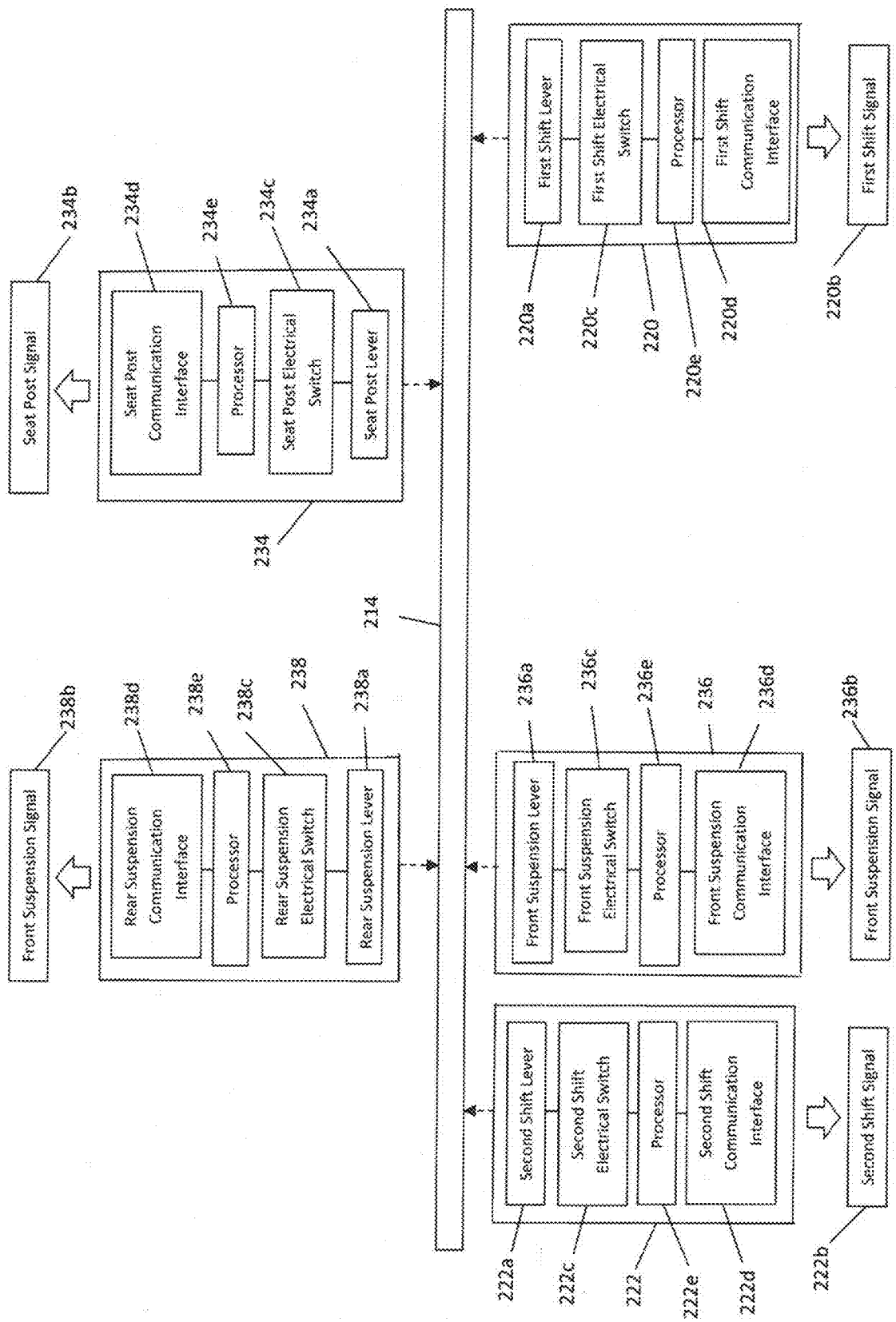
FIG. 2B is a schematic diagram of a handlebar assembly of the example mountain bicycle shown in FIG. 2A, and other components coupled to the handlebar assembly.
Figure 2C:
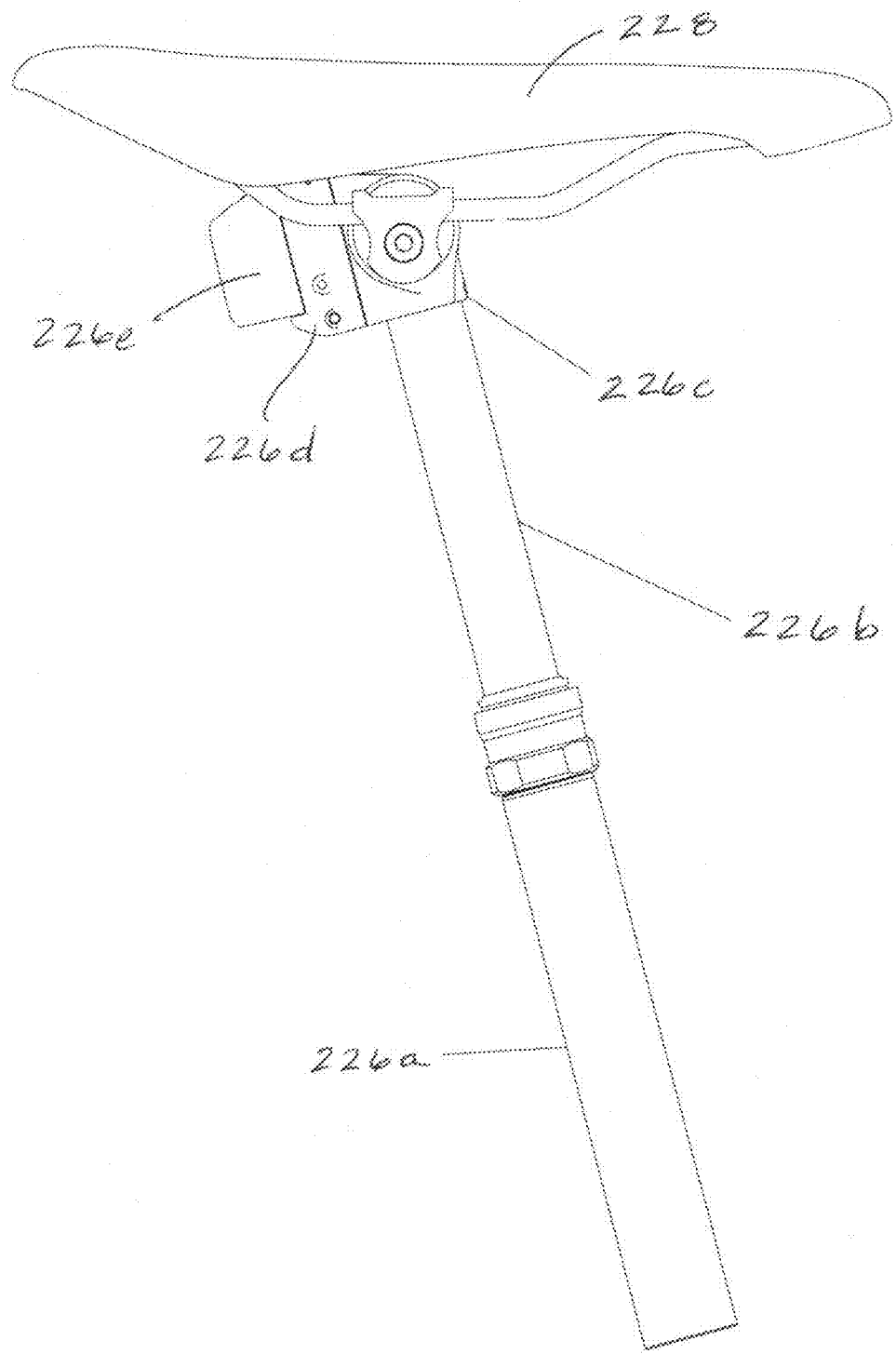
FIG. 2C is a side view of a seat post assembly, with a saddle installed thereon, of the example mountain bicycle shown in FIG. 2A.

Referring to FIGS. 2A and 2B, the bicycle 200 includes a first or right controller device 220 and a second or left controller device 222. The first controller device 220 and the second controller device 222 include a first electrical switch 220c and a second electrical switch 222c, respectively, that are actuated by a first input element and a second input element, respectively (e.g., a first shift lever or button 220a and a second shift lever or button 222a, respectively). The handlebar assembly 214 includes a flat bar or a riser bar instead of drop bars. As such, the first controller device 220 is coupled to a right side of the flat or riser bar, and the second controller device 222 is coupled to a left side of the flat or riser bar. Additionally, the bicycle 200 may include a seat post controller device 234, a front suspension controller device 236, and a rear suspension controller device 238 coupled to the handlebar assembly 214. In other embodiments, one or more of the controller devices (e.g., the first controller device 220 and the seat post controller device 234) may be formed by a single controller device (e.g., a single lever or button).

The user may operate the first shift lever 220a and/or the second shift lever 222a as described above to generate a first shift signal 220b and/or a second shift signal 222b, respectively. Similar to the bicycle 100, the first shift signal 220b and/or the second shift signal 222b may be employed to control the rear derailleur 208f. To allow the user to adjust the height of the seat post assembly 226, the seat post controller device 234 includes a seat post electrical switch 234c that is actuated by a seat post input element 234c such as a lever or button.

To allow the user to adjust the characteristics of the front suspension system 230 and the rear suspension system 232, the front suspension controller device 236 and the rear suspension controller device 238 include a front suspension electrical switch 236c and a rear suspension electrical switch 238c that are actuated by suspension input elements 236a, 238a, respectively, such as levers or buttons. Alternatively, the adjustable seat post assembly 226, the adjustable front suspension system 230, and the adjustable rear suspension system 232 may also be configured to receive the first shift signal 220b and/or the second shift signal 222b, so that these devices may also be controlled by operation of the first shift lever 220a and/or the second shift lever 222a.

The seat post controller device 234, the front suspension controller device 236, and the rear suspension controller device 238 include processors 234e, 236e 238e, respectively, that electronically process the manual input received by the seat post input element 234a, the front suspension input element 236a, and the rear suspension input element 238a, respectively. The seat post input triggers a seat post controller communication interface 234d to wirelessly send a seat post signal 234b. The front and rear suspension inputs trigger front and rear controller communication interfaces 236d, 238d, respectively, to wirelessly send a front suspension signal 236b and a rear suspension signal 238b, respectively. Correspondingly, the seat post assembly 226 includes a communication interface and a processor that is configured to receive and electrically process the seat post signal 234b to determine a designated response. The front and rear suspensions include communication interfaces and processors that are configured to receive and electronically process the front suspension signal 236b and the rear suspension signal 238b, respectively, to determine a designated response.

FIGS. 1A-1E and 2A-2C illustrate how various controller devices may be employed to wirelessly communicate control signals to different combinations of operation-enacting devices. The signals from the controller devices may be communicated wirelessly using any technique, protocol, or standard. For instance, Institute of Electrical and Electronics Engineers ("IEEE") 802.11 standards, IEEE 802.15.1 or BLUETOOTH® standards, and/or ANT™ or ANT+™ standards may be used. In some embodiments, however, control signals may be communicated wirelessly over a proprietary protocol, such as one that operates on top of the physical layer of the IEEE 802.15.4 wireless protocol.

Figure 3:
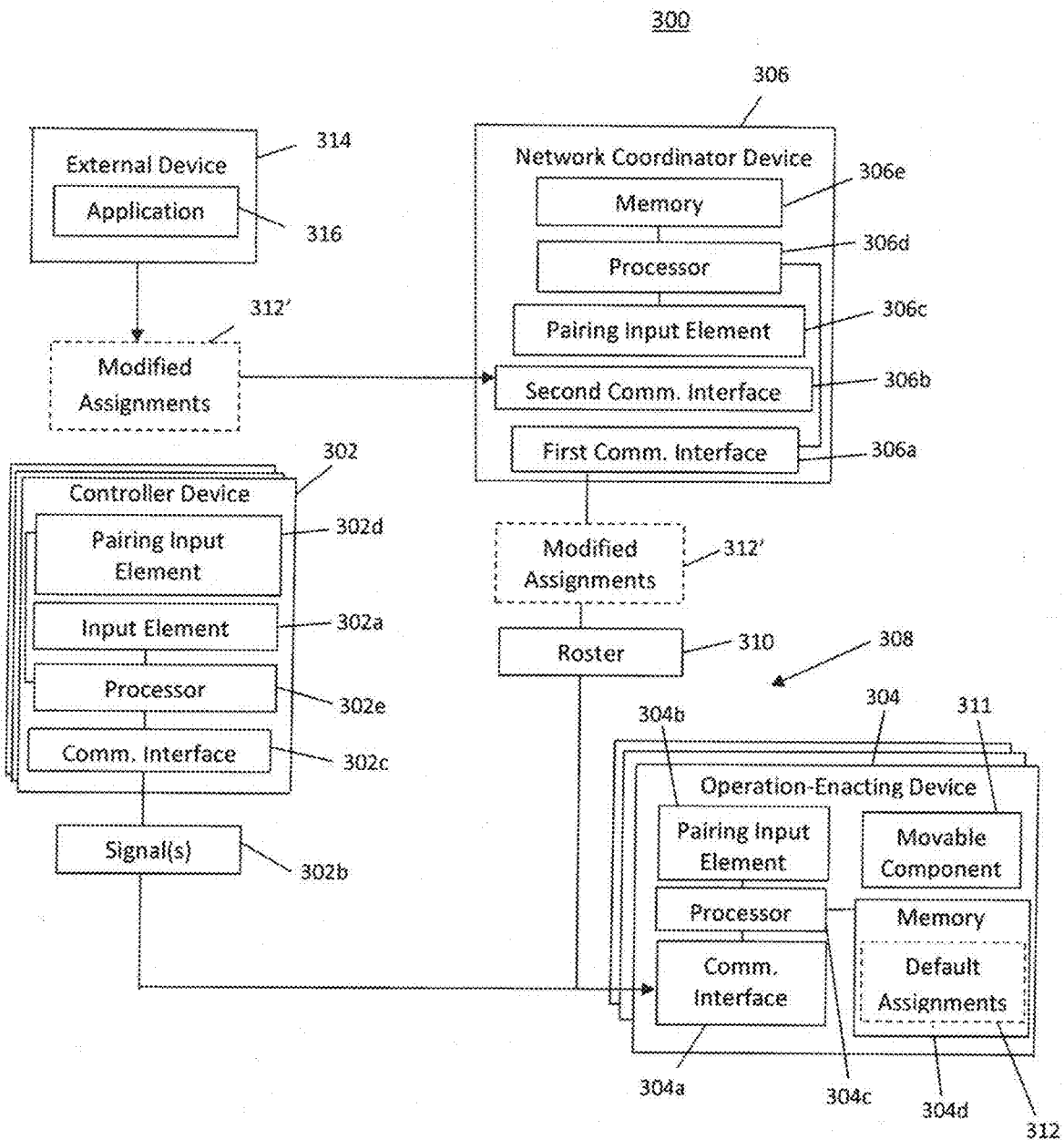
FIG. 3 illustrates an example system for controlling different combinations of operation-enacting devices on a bicycle, according to aspects of the present disclosure.

FIG. 3 illustrates an example system 300 for controlling different combinations of operation-enacting devices on a bicycle. The system 300 includes a plurality of controller devices 302. Each controller device 302 includes at least one respective input element 302a configured to receive input from a user. For example, as described above, the controller devices 302 may include a right controller device and a left controller device coupled to a handlebar assembly, where respective shifter levers act as input elements 302a. In general, input elements 302a may include any variety of shifter, pushbutton, clicker, switch, other toggled device, sensor (e.g., peddling sensor, etc.), or the like. A single controller device 302 may also include more than one input element 302a (e.g., two shifter levers, a plurality of pushbuttons, etc.).

Each controller device of the plurality of controller devices 302 may include one or more additional components. For example, a respective controller device 302 may include a processor 302e, a communications interface 302c, and/or a memory. The plurality of controller devices 302 are configured to transmit to, for example, a plurality of operation-enacting device 304, signals 302b (e.g., data streams) indicating input received by the input elements 302a of the controller devices 302. For example, the first controller device 120 and the second controller device 122 may wirelessly transmit a first shift signal 120b and a second shift signal 120a as described above to indicate input received by the first shift lever 120a and the second shift lever 122a, respectively.

The system 300 also includes the plurality of operation-enacting devices 304, where each operation-enacting device 304 is configured to enact at least one respective operation on the bicycle. For example, the operation-enacting devices 304 include a front derailleur, a rear derailleur, a height-adjustable seat post assembly, a front suspension system, and/or a rear suspension system as described above. Each operation-enacting device 304 may include at least one movable component 311 configured to modify an operative state of the bicycle. Each operation-enacting device of the plurality of operation-enacting devices 304 includes a processor 304c and may include a memory 304d.

In some cases, an operation-enacting device 304 may act on more than one component of the bicycle in a single operation. In other cases, a single operation may include more than one act on one or more components of the bicycle. In yet other cases, the operation may include a physical action and a wireless action, where the wireless action sends wireless signals to cause further action by other cooperative device(s).

The system 300 also includes a network coordinator device 306. The network coordinator device 306 includes a first communication interface 306a configured to communicate wirelessly with the controller devices 302 and the plurality of operation-enacting devices 304. Using the first communication interface 306a, the network coordinator device 306 may establish a wireless network 308 that enables communications between the network coordinator device 306, the controller devices 302, and the plurality of operation-enacting devices 304. Correspondingly, each controller device 302 includes a communication interface 302c and each operation-enacting device 304 includes a communication interface 304a for communicating with other devices (e.g., receiving and transmitting data/signals) on the wireless network 308. The network coordinator device 306 further includes a processor 306d and may include a memory 306e.

In the embodiment shown in FIG. 3, the network coordinator device 306 further includes a second communication interface 306b configured to communicate wirelessly with an external computing device 314, such as a smart phone, a computing tablet, a laptop, a personal computer, or the like. Using the second communication interface 306b, the network coordinator device 306 may establish a wireless network 308 that enables communications between the network coordinator device 306 and the external computing device 314. The external computing device 314 may include an application 316, such as a mobile application or other computer software.

Although the network coordinator device 306 may appear in FIG. 3 as a separate device, the features of a network coordinator device 306 in alternative embodiments may be provided by one or more of the other controller devices 302 and/or operation-enacting devices 304 such as a rear derailleur.

The processors 302e, 304c, 306d, for example, of the system 300 may include a general processor, digital signal processor, an application specific integrated circuit (ASIC), field programmable gate array (FPGA), analog circuit, digital circuit, combinations thereof, or other now known or later developed processor. The processor may be a single device or combinations of devices, such as through shared or parallel processing.

The memory 304d, 306e, for example, of the system 300 may be any number of different types of memory. For example, such memory may be a volatile memory or a non-volatile memory. The memory may include one or more of a read only memory (ROM), random access memory (RAM), a flash memory, an electronic erasable program read only memory (EEPROM), or other type of memory. The memory may be removable from the corresponding device, such as a secure digital (SD) memory card. Computer memory includes any one or more of a computer-readable medium and other equivalents and successor media, in which data or instructions may be stored. In general, a computer-readable medium includes any medium that is capable of storing, encoding or carrying a set of instructions for execution by a processor or that cause a computer system to perform any one or more of the methods or operations disclosed herein.

To power wireless communications and computer processing, the system 300 may include power supplies, which may be stored internal to the operating device or stored external to the operating device. The power supply may include a combination of multiple batteries or other power providing devices. Specially fitted or configured battery types, or standard battery types such as CR 2012, CR 2016, and/or CR 2032 may be used. In some embodiments, the devices in a system are all individually powered (e.g. by a dedicated battery).

As described above, the embodiments employ communication interfaces. Such communication interfaces are configured to send data such as control signals and/or commands to bicycle components. For example, the communication interface provides for wireless communications in any now known or later developed format. Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustration or other representation of devices, such as the network coordinator devices 306, the controller devices 302, and the operation-enacting devices 304, include (even if not expressly labeled) any combination of processor(s), memory device(s) (e.g., computer-readable media storing program instructions for execution by processor(s)), communication interface(s), and power supply necessary to achieve the disclosed features.

At least some controller devices 302 of the plurality of controller devices 302, at least some operation-enacting devices of the plurality of operation-enacting device 304, and the network coordinator device 306 are paired into the wireless network 308, and a roster 310 is defined by the controller devices 302 and the operation-enacting devices 304 that have been paired to the wireless network 308 at the end of a pairing session. By fixing the roster 310, the system 300 only includes the devices 302, 304 selected by the user.

When the pairing session ends, the network coordinator device 306 is configured to transmit, to the operation-enacting devices 304, the roster 310 identifying the controller devices 302 and the operation-enacting devices 304 paired to the wireless network 308. The operation-enacting devices 304 are configured to determine, based on the roster 310 received from the network coordinator device 306, how to enact operations in response to the signals 302*b* received from the controller devices 302.

The operation-enacting devices 304 are configured to process a default set of assignments 312 based on the roster 310 to determine how the operation-enacting devices 304 enact the operations responsive to the signals 302*b*. The default set of assignments 312 may be transmitted to each operation-enacting device 304 by the network coordinator device 306, and/or stored locally on each operation-enacting device 304.

For example, after a pairing session is completed, the roster 310 may include a right controller device with a right shift lever, a left controller device with a left shift lever, a front derailleur, and a rear derailleur. The default set of assignments 312 controlling the operation of the operation-enacting devices 304 is determined according to the particular set of devices in the roster 310. For example, the default set of assignments 312 may provide that with the example roster 310 above: (i) the rear derailleur shifts the chain to a sprocket inboard relative to the frame of the bicycle in response to a signal corresponding to an abbreviated button press from the right controller device (with no signals from the right controller device); (ii) the rear derailleur shifts the chain to a sprocket outboard relative to the frame of the bicycle in response to a signal corresponding to an extended button press from the right controller device (with no signals from the left controller device); and (iii) the front derailleur shifts the chain to an alternate chainring in response to a signal from the left controller device. If the roster 310 includes a different set of devices, the default set of assignments 312 may be different. For example, if the roster 310 includes a height-adjustable seat post assembly and does not include a front derailleur, the seat post assembly lowers the seat in response to a signal from the left controller device. Other configurations may be provided.

Although the default set of assignments 312 may provide an effective approach for determining how the operation-enacting devices 304 should respond to the signals 302*b* from the controller devices 302, the user may prefer to use a modified set of assignments 312'. For example, the modified set of assignments 312' may provide that with the example roster 310 above: (i) the rear derailleur shifts the chain to an inboard sprocket relative to the frame of the bicycle in response to signals corresponding to an abbreviated button press from the right controller device (without signals from the left controller device); (ii) the front derailleur shifts the chain to an alternate chainring in response to signals corresponding to an extended button press from the right controller device (without signals from the left controller device); and (iii) the rear derailleur shifts the chain to the chain to an outboard sprocket relative to the frame of the bicycle in response to signals from the left controller device.

Accordingly, aspects of the present disclosure allow the assignments between the controller devices 302 and the operation-enacting devices 304 to be modified to reconfigure the system 300. As shown further in FIG. 3, the network coordinator device 306 may include the second wired and/or wireless communication interface 306*b* configured to receive the modified set of assignments 312', where the modified set of assignments 312' causes at least one operation enacted by an operation-enacting device 304 to occur in response to the signals 302*b* from a different controller device 302. The second communication interface 306*b* may employ a different protocol than the first communication interface 306*a*, particularly if the first communication interface 306*a* employs a proprietary protocol. The modified set of assignments 312' may be defined by the user within, for example, the mobile application, and transmitted to the operation-enacting devices 304 via the second wired and/or wireless communication interface 306*b* of the network coordinator device 306.

Figure 4:
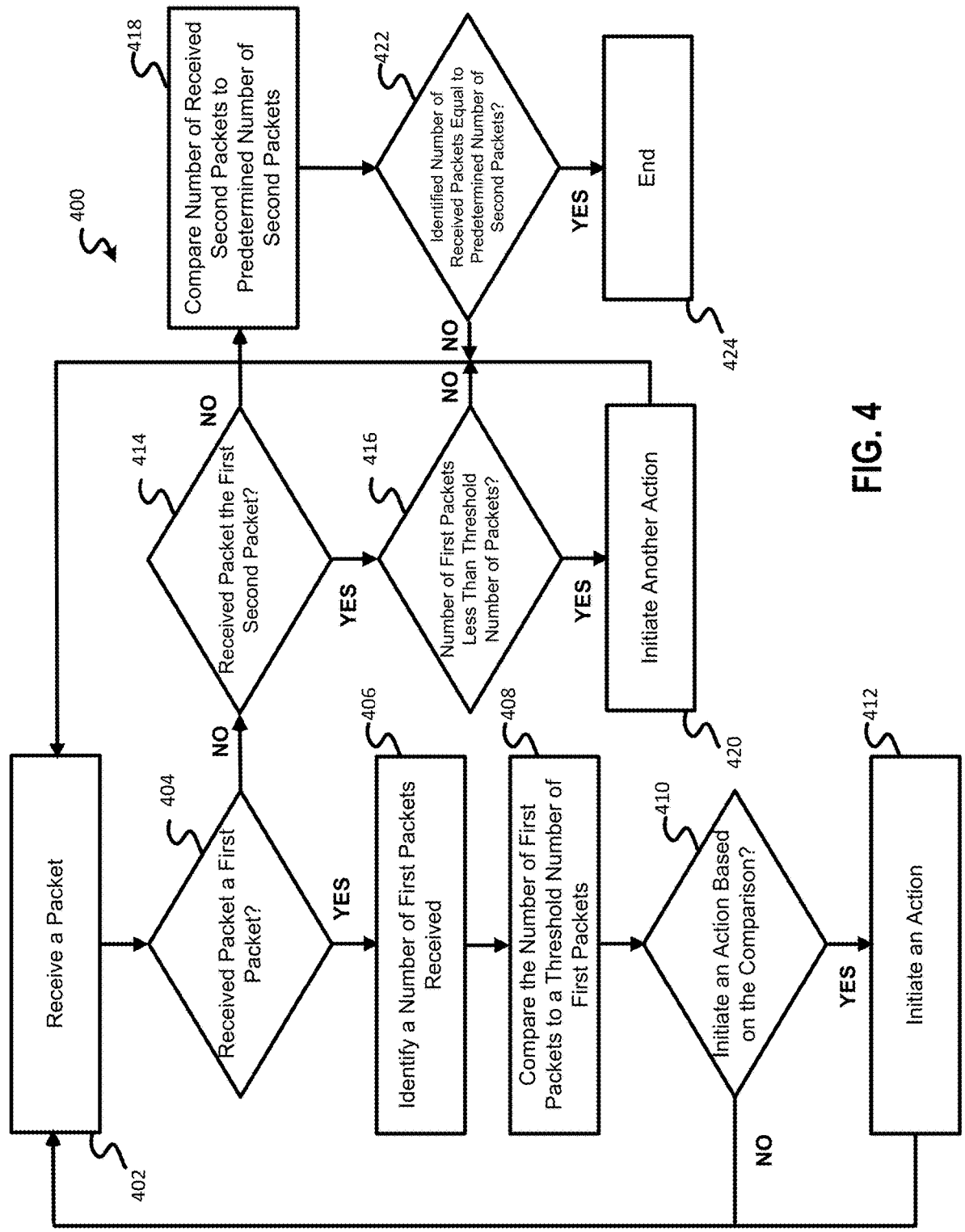
FIG. 4 illustrates a flow chart of an embodiment of a method for controlling electronic component of a bicycle.
Figure 10:
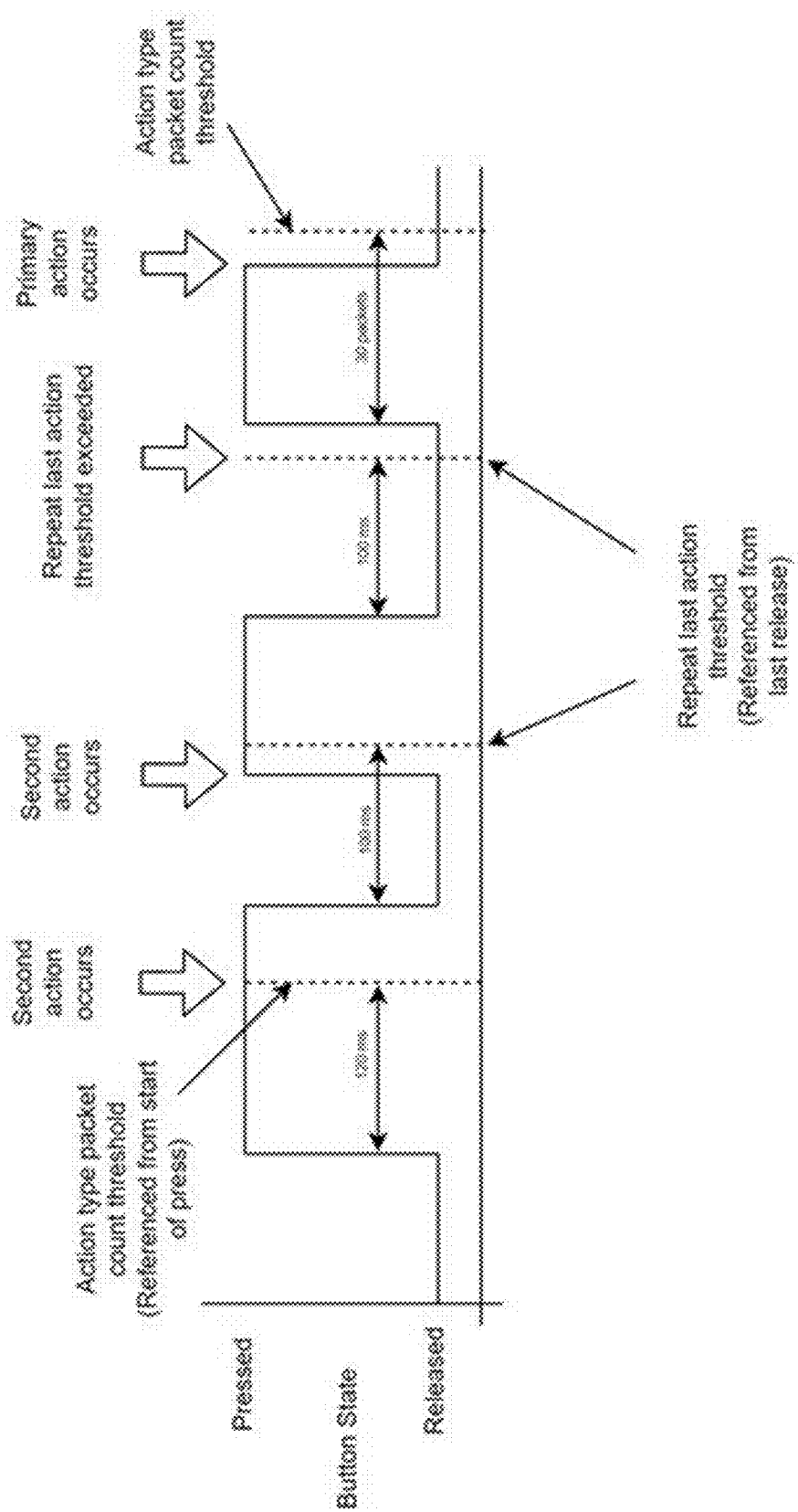
FIG. 10 is a plot of button state over number of packets generated and transmitted for an example of a repeat button press feature.

FIG. 4 illustrates a method 400 for controlling one or more electronic components (e.g., the operation-enacting devices 304) of a bicycle. The acts of the method 400 presented below are intended to be illustrative. In some embodiments, the method 400 may be accomplished with one or more additional acts not described, and/or without one or more of the acts discussed. Additionally, the order in which the acts of the method 400 are illustrated in FIG. 10 and described below is not intended to be limiting.

In some embodiments, the method 400 may be implemented in one or more processing device (e.g. digital processor, an analog processor, a digital circuit designed to process information, an analog-circuit designed to process information, a state machine, and/or other mechanisms for electronically processing information). The one or more processing devices include one or more devices executing some or all the acts of the method 400 in response to instructions stored electronically on an electronic storage medium. The one or more processing devices are configured through hardware, firmware, and/or software to be specifically designed for execution of one or more of the acts of the method 400.

As presented in the following, acts may be performed using any combination of the components indicated in FIGS. 1A-1E, 2A-2C, 3, and/or other components. In one embodiment, the method 400 is executed by one or more processing devices of an operation-enacting device (e.g., an operation-enacting device 304 such as a rear derailleur). Alternatively, the method 400 may be executed by one or more processing devices of a controller device (e.g., a controller device 302).

In act 402, a controller of the bicycle receives a packet of a data stream (e.g., a signal). The controller may include or be a processor of any number of components of the bicycle including, for example, a rear derailleur (e.g., an operation enacting device 304). The data stream may be generated by a control device (e.g., a controller device 302) of the bicycle or another device in response to user input. For example, the control device may generate the data stream in response to a user (e.g., a rider) pressing a button or a lever (e.g., an input element 302a) of the control device on the bicycle (e.g., at the handlebar assembly 114), and transmit the data stream to, for example, the controller over a wireless network (e.g., the wireless network 308).

Figure 5:
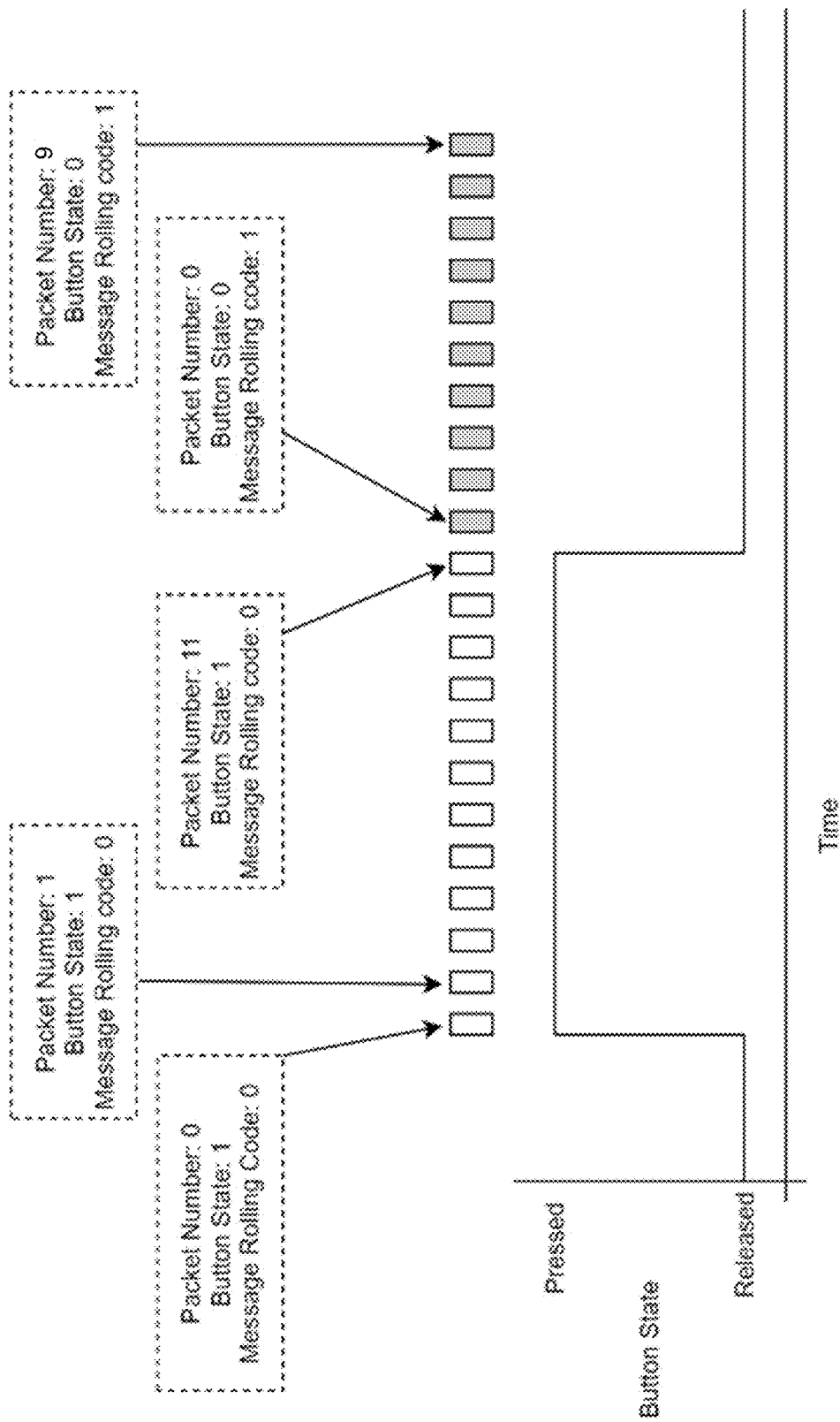
FIG. 5 is an example of a plot of button state over time and corresponding packets generated and transmitted.

Referring to FIG. 5, when, for example, the button is pressed by the rider, the control device begins sending data packets (e.g., first data packets) indicating that the button has been pressed. The control device may continue transmitting the first data packets periodically (e.g., at a predetermined rate) until the button is released. In one embodiment, the control device transmits the first data packets irregularly. When the button is released, the controller transmits a predetermined number of packets (e.g., second packets) indicating that the button has been released. When the controller receives the predetermined number of second packets, the controller may identify that the button was released, not that one or more packets were not received. This allows the controller to act rapidly to button state changes (e.g., pressed to released) without having to account for possible packet loss.

The data stream includes a combination of first packets and second packets. The data stream ends when a last packet of the predetermined number of second packets is received by the controller. Each packet of the data stream, the first data packets and the second data packets, includes, for example, data identifying which button or buttons were pressed, a global rolling code, and a packet counter indicating a number of packets transmitted for a particular event (e.g., a particular button press, such as a first button press, or a particular button release, such as a first button release), and/or other data.

Referring to FIG. 5, when the button is first pressed, the control device may generate a first packet of the data stream (e.g., a first of the first data packets). The first packet may include data identifying a button state corresponding to the button being pressed (e.g., button state "1"), data identifying a packet number (e.g., packet number data) within the particular event (e.g., a first button press), and data identifying a global rolling code (e.g., "0" for the first press of the button; incremented with each identified event, button press or button release, within the data stream). As long as the button is pressed, the control device generates the first data packets periodically (e.g., at a first predetermined interval) and transmits the first data packets. The example of FIG. 5 shows the button press extended for packet number "11" to be generated and transmitted. The number of first packets being generated and transmitted by the control device corresponds to a character of the press of the button, such as extended or abbreviated.

When the control device identifies the button is no longer being pressed (e.g., a switch in communication with the button is no longer activated), the control device generates second packets and transmits the second packets to the controller. The control device increments the global rolling code, such that each of the second packets shown in FIG. 5 includes data identifying the global rolling code as "1" (e.g., corresponding to the first button release). The second packets include data identifying the button state (e.g., button state "0" identifying the release of the button), and packet number data within the particular event (e.g., a first button release). In other words, a count of the number of packets within a particular event identified within the data stream is restarted.

The first packets and the second packets differ in the data identifying the button state. The first packets include data for button state "1", which indicates a button press, and the second packets include data for button state "0", which indicates a button release.

As long as the button is released, the control device generates the second data packets periodically (e.g., at the first predetermined interval or a second predetermined interval that is different than the first predetermined interval) and transmits the second data packets. The example of FIG. 5 shows the button being released enough for packet number "9" to be generated and transmitted. The number of second packets being generated and transmitted by the control device corresponds to a character of the release of the button. The second packets are generated and transmitted by the control device until the predetermined number of second packets have been generated and transmitted by the control device, or the control device identifies a button press (e.g., a second button press) before the predetermined number of second packets can be generated and transmitted. The example of FIG. 5 shows the predetermined number of second packets being generated and transmitted, such that the data stream ends.

The data stream generated and transmitted to the controller may be shorter or longer than the data stream shown in FIG. 5. For example, fewer first packets (e.g., corresponding to an abbreviated first button press) may be generated and transmitted. As other examples, more first packets (e.g., corresponding to an extended first button press) may be generated and transmitted and/or the button may be pressed a second time (e.g., a second button press) before the predetermined number of second packets are generated and transmitted. The sequence shown in FIG. 5, with the number of first packets corresponding to the character of the button press and the number of second packets corresponding to the character of the button release, may be repeated each time the button is pressed before the predetermined number of second packets can be generated and transmitted.

In act 404, the controller determines whether the received packet is a first packet. For example, based on the data identifying the button state included within the received packet, the controller may identify whether the received packet is a first packet or a second packet. If the controller identifies the received packet as a first packet, which the control device generates and transmits in response to a button press, the method 400 moves to act 4006. If the controller identifies the received packet as a second packet, which the control device generates and transmits after a button release, the method 400 moves to act 414.

In act 406, the controller identifies the number of first packets received by the controller. In one embodiment, the controller identifies the number of first packets generated and/or transmitted by the control device and/or received by the controller within the particular event. For example, based on the data identifying the global rolling code and the data identifying the button state included within the received packet, the controller may identify the number of packets generated and/or transmitted by the control device within a particular event (e.g., the first button press).

For the first button press, for example, the controller identifies the number of first packets generated and/or transmitted by the control device and/or received by the controller. The controller may identify the number of first packets transmitted by the controller within the particular event, for example, in any number of ways. For example, the controller may identify the number of first packets transmitted by the control device within data of the received first packet. For example, the controller may identify the number of first packets transmitted by the controller within the particular event within the packet number data of the received first packet. Alternatively or additionally, the controller may count, for a particular value of the global rolling code (e.g., "0" identifying the first button press) corresponding to the particular event, the first packets as the first packets are received. For example, the controller may increase a count stored within a memory of the controller with each received first packet, and may restart the count when the controller identifies a new value of the global rolling code (e.g., "1" identifying a new event, the first button release) with the receipt of, for example, a second packet.

In act 408, the controller compares the number of first packets identified in act 406 to a predetermined threshold number of first packets. The predetermined threshold number of first packets may be stored in the memory of the controller. The predetermined threshold number of first packets may be set and stored in the memory of the controller at manufacture of the controller, the component that includes the controller (e.g., the rear derailleur), or the bicycle, and/or may be set and stored by the rider. The predetermined threshold number of first packets defines a character of an abbreviated press of the button (e.g., a number of first packets received by the controller that is less than the predetermined threshold number of first packets) and a character of an extended press of the button (e.g., a number of first packets received by the controller that is greater than or equal to the predetermined threshold number of first packets). Different actions may be assigned to the abbreviated press and the long press, respectively.

In one embodiment, the comparison of the identified number of first packets may include determining whether the identified number of first packets is less than the predetermined threshold number of first packets, equal to the predetermined threshold number of first packets, and/or equal to a multiple of the predetermined threshold number of first packets. For example, if the predetermined threshold number of first packets is 30 packets, the comparison of the identified number of first packets may include determining whether the identified number of first packets is equal to 30 packets and/or determining whether the identified number of first packets is equal to a multiple of 30 packets (e.g., 60 packets, 90 packets, 120 packets, etc.). The predetermined threshold number of first packets may be more or less than 30.

In act 410, the controller determines whether to initiate an action of an electronic component of the bicycle based on the comparison in act 408. For example, the controller determines the action is to be initiated when, based on the comparison, the identified number of first packets is equal to the predetermined threshold number of first packets. In one embodiment, the controller determines the action is to be initiated when based on the comparison, the identified number of first packets is equal to a multiple of the predetermined threshold number of first packets. For example, the controller may determine the action is to be initiated each time, based on the comparison, the identified number of first packets equals a multiple (e.g., the first multiple, the second multiple, and the third multiple) of the predetermined threshold number of first packets.

If the controller determines the action is not to be initiated, the method 400 returns to act 402 for the receipt of an additional packet of the data stream. If the controller determines an action is to be initiated, the method 400 moves to act 412.

In act 412, the controller initiates an action (e.g., a secondary action, which corresponds to an extended press of the button) of an electronic component of the bicycle. The action corresponds to the extended button press, as defined by the number of first packets received by the controller. The extended button press may control actions of any number of electronic components of the bicycle. For example, the electronic component may be the rear derailleur, and the action may be the activation of a motor of the rear derailleur, such that the motor of the rear derailleur rotates in a first rotational direction and the rear derailleur shifts gears in a first direction relative to a frame of the bicycle (e.g., outboard or inboard). As another example, the electronic component may be a front derailleur, and the action may be the activation of a motor of the front derailleur, such that the motor of the front derailleur rotates in a first rotational direction and the front derailleur shifts chainrings in the first direction relative to the frame or a second direction relative to the frame (e.g., outboard or inboard). As yet another example, the electronic component may be a seat post assembly of the bicycle, and the action may be the actuation of a valve of the seat post assembly, such that the valve opens and a height of a seat post of the seat post assembly is changeable. In such an example, the controller may close the valve when the controller receives one of the second packets of the data stream (see act 414). In another example, the electronic component may be a suspension assembly of the bicycle, and the action may be actuation of a damper of the suspension assembly, such that a rigidity of the suspension assembly is changed. The electronic component may be a different electronic component of the bicycle, and/or the action may be a different action.

Figure 6B:
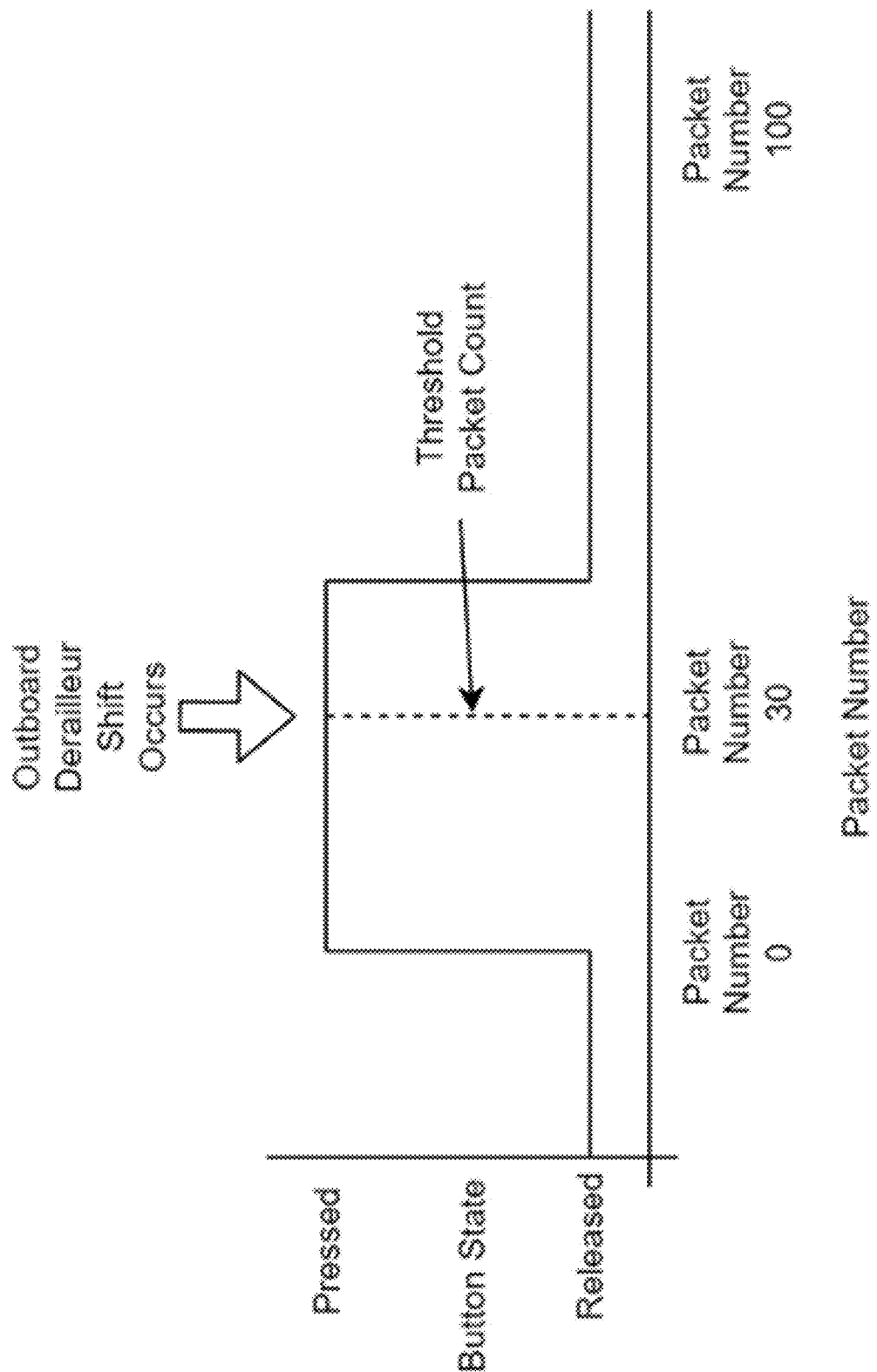
FIG. 6B is a plot of button state over number of packets generated and transmitted for a second example of an extended button press.

FIG. 6A illustrates a first example, in which the predetermined threshold number of first packets is thirty, and the controller initiates the action when the identified number of first packets equals thirty. The action of the example shown in FIG. 6A is the shifting of the rear derailleur in the inboard direction. Other predetermined threshold numbers of first packets may be used. For example, FIG. 6B illustrates a second example, in which the predetermined threshold number of first packets is thirty, and the controller initiates the action when the identified number of first packets equals thirty. The action of the example shown in FIG. 6B is the shifting of the rear derailleur in the outboard direction.

Figure 7:
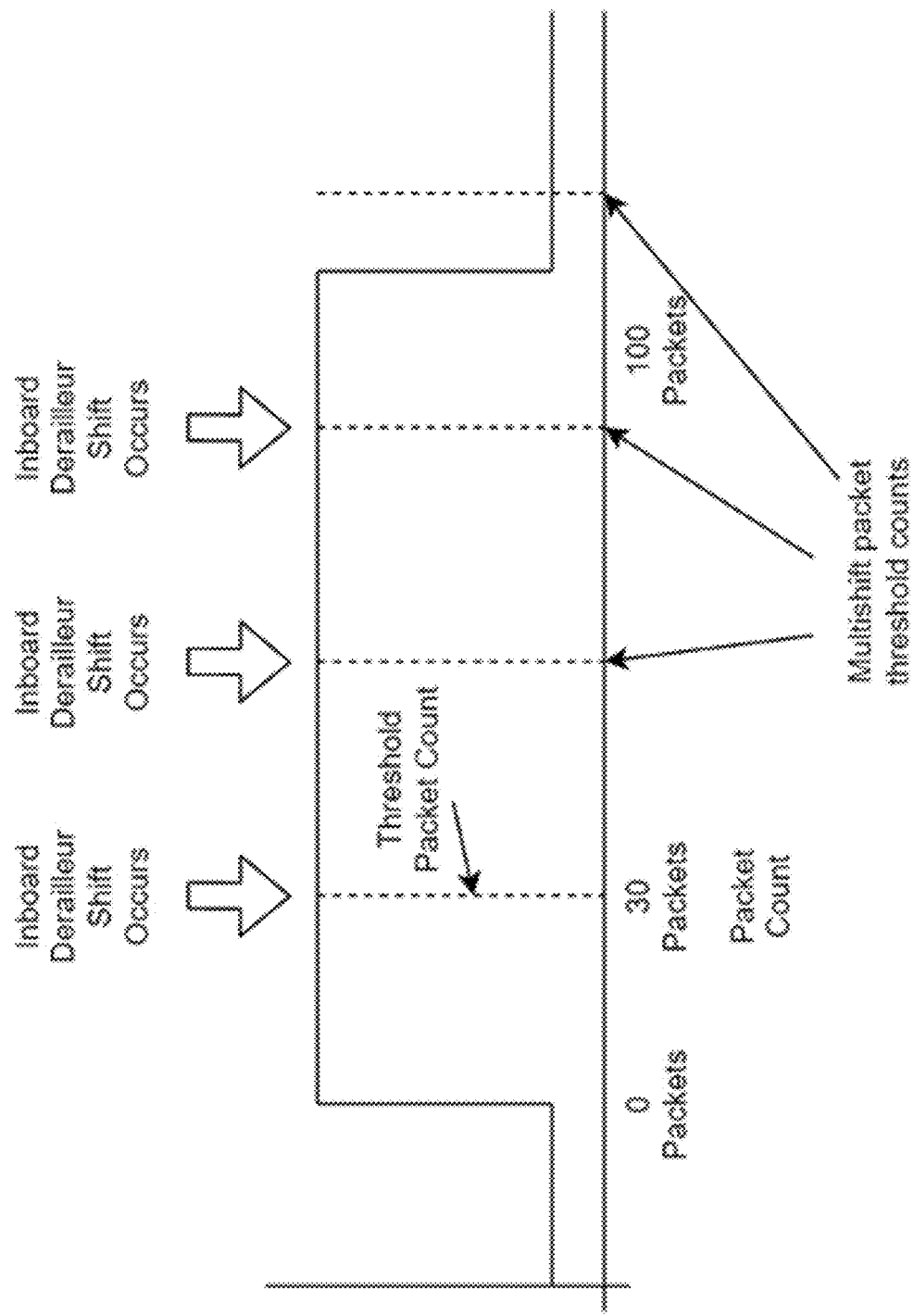
FIG. 7 is a plot of button state over number of packets generated and transmitted for a third example of an extended button press.

FIG. 7 illustrates an example in which the predetermined threshold number of first packets is thirty, and the controller initiates the action (e.g., shift of the rear derailleur in the inboard direction or shift of the rear derailleur in the outboard direction) when the identified number of first packets equals a first multiple of the predetermined threshold number of first packets (e.g., thirty packets), a second multiple of the predetermined threshold number of first packets (e.g., sixty packets), and a third multiple of the predetermined threshold number of first packets (e.g., ninety packets). In other words, the controller determines the action is to be repeated every time the identified number of first packets is equal to a multiple of the predetermined threshold number of first packets over the extended button press. The predetermined threshold number of first packets may be more or less than thirty, and/or more or fewer multiples of the predetermined number of first packets may be received during the extended button press.

In the example shown in FIG. 7, a same action (e.g., shift of the rear derailleur in the inboard direction) is initiated by the controller every time a multiple of the predetermined threshold number of first packets is received by the controller. In another embodiment, the controller may initiate different actions of a same electronic component of the bicycle when different multiples of the predetermined threshold number of packets is received by the controller. For example, the controller may initiate the opening of the valve of the seat post assembly when the identified number of first packets is equal to the first multiple of the predetermined threshold number of first packets, and initiate the closing of the valve of the seat post assembly when the identified number of first packets is equal to the second multiple of the predetermined threshold number of first packets. In yet another embodiment, the controller may initiate different actions of different electronic components of the bicycle when different multiples of the predetermined threshold number of packets is received by the controller. For example, the controller may initiate an inboard shift of the rear derailleur when the identified number of first packets is equal to the first multiple of the predetermined threshold number of first packets, and initiate a shift of the front derailleur when the identified number of first packets is equal to the second multiple of the predetermined threshold number of first packets. The controller may initiate actions of more, fewer, and/or different components of the bicycle during such an extended button press.

In one embodiment, the controller initiates a first action of a component of the bicycle (e.g., the seat post assembly) when the identified number of first packets is equal to the predetermined threshold number of first packets, and after all of the first packets are received for a button press (e.g., the first button press; as evidenced by receipt of a second packet), the controller initiates a second action of the component. For example, the controller may initiate the opening of the valve of the seat post assembly when the identified number of first packets is equal to the predetermined threshold number of first packets, and initiate the closing of the valve of the seat post assembly when all of the first packets for the button press are received by the controller.

Figure 8:
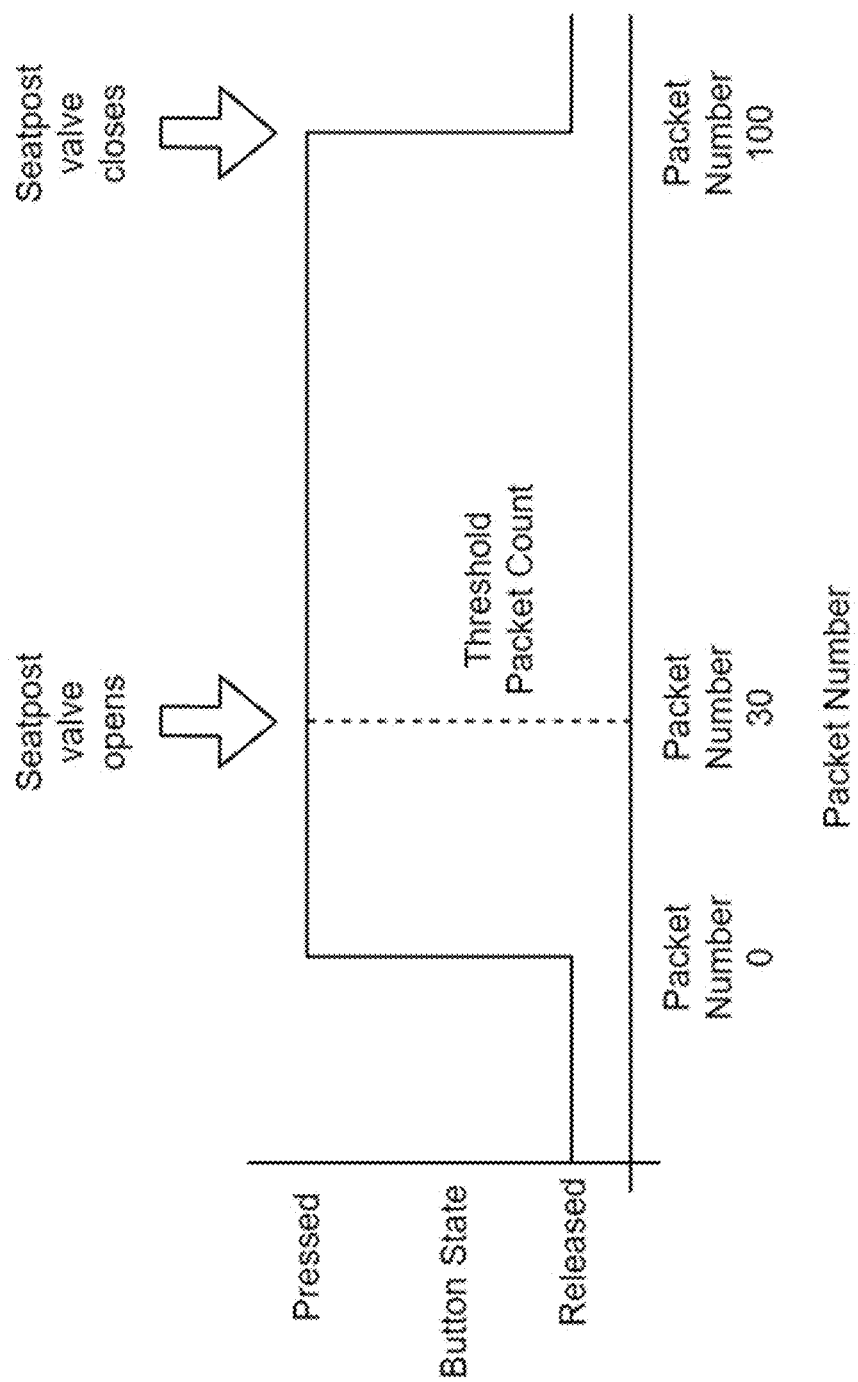
FIG. 8 is a plot of button state over number of packets generated and transmitted for a fourth example of an extended button press.

FIG. 8 illustrates an example in which the predetermined threshold number of first packets is thirty, and the controller initiates the opening of the valve of the seat post assembly (e.g., a first action of the seat post assembly) when the identified number of first packets equals thirty. After all of the first packets are received by the controller (e.g., after 100 packets are received), the controller initiates the closing of the valve of the seat post assembly (e.g., a second action of the seat post assembly). Other predetermined threshold numbers of first packets, other first actions, other second actions, and/or other controlled bicycle components may be provided.

After act 412, the method 400 returns to act 402 for the receipt of an additional packet of the data stream.

In act 414, after the controller identifies the received packet as a second packet in act 404, the controller determines whether the received second packet is a first second packet received by the controller after a button release (e.g., a first second packet). Receipt of the first second packet identifies the end of a button press.

The controller may determine whether the received second packet is the first second packet in any number of ways including, for example, using data of the received second packet. For example, the controller may identify a number of second packets the controller has received using the packet number data (e.g., within the particular event, such as the first button release, corresponding to a value of the global rolling code) of the received second packet. For example, the controller may determine the received second packet is the first second packet when the controller identifies a value of "0" within the packet number data. Alternatively or additionally, the controller may monitor the value of the global rolling code and determine the received second packet is the first second packet when the global rolling code changes with the received second packet. When the controller determines the received second packet is the first second packet, the method 400 moves to act 416. Otherwise, the method 400 moves to act 418.

In act 416, the controller determines whether, based on the most recent comparison in act 408, the controller received fewer than the predetermined threshold number of first packets before the controller received the first second packet. In other words, the controller determines, based on how many first packets were received before the first second packed was received, whether the most recent press of the button (e.g., the first button press) was an abbreviated button press. When the controller determines the most recent button press was an abbreviated button press in act 416, the method 400 moves to act 420. Otherwise, the method 400 returns to act 402.

In act 420, the controller initiates another action (e.g., a primary action, which corresponds to an abbreviated press of the button) of the electronic component or an action of another electronic component of the bicycle. The action initiated in act 420 corresponds to the abbreviated button press, as defined by the number of first packets received by the controller prior to receipt of the first second packet. Any number of first packets less than the predetermined threshold number of first packets may be received by the controller during the abbreviated button press. For example, only one first packet may be received by the controller during the abbreviated button press. As another example, one less than the predetermined threshold number of first packets may be received by the controller during the abbreviated button press.

The abbreviated button press may control actions of any number of electronic components of the bicycle. For example, the electronic component may be the rear derailleur, and the action may be the activation of the motor of the rear derailleur, such that the motor of the rear derailleur rotates in a second rotational direction and the rear derailleur shifts gears in the second direction relative to the frame of the bicycle (e.g., inboard or outboard). In one embodiment, the controller initiates a shift of the rear derailleur in one of the inboard direction and the outboard direction when the abbreviated button press is identified, and initiates a shift of the rear derailleur in the other of the inboard direction and the outboard direction when the extended button press is identified.

The controller may only initiate the primary action, for example, if the controller receives a second packet after a last of the first packets is received by the controller. In other words, the controller may not initiate any action if the controller receives fewer than the predetermined threshold number of first packets and the controller does not receive a second packet after the last of the first packets is received. When the controller receives a second packet after the last of the first packets is received, the controller may identify that the button has been released. When the controller does not receive a second packet after the last of the first packets is received, the controller may not identify whether the button has been released or communication between the control device and the controller has been interrupted.

Figure 9A:
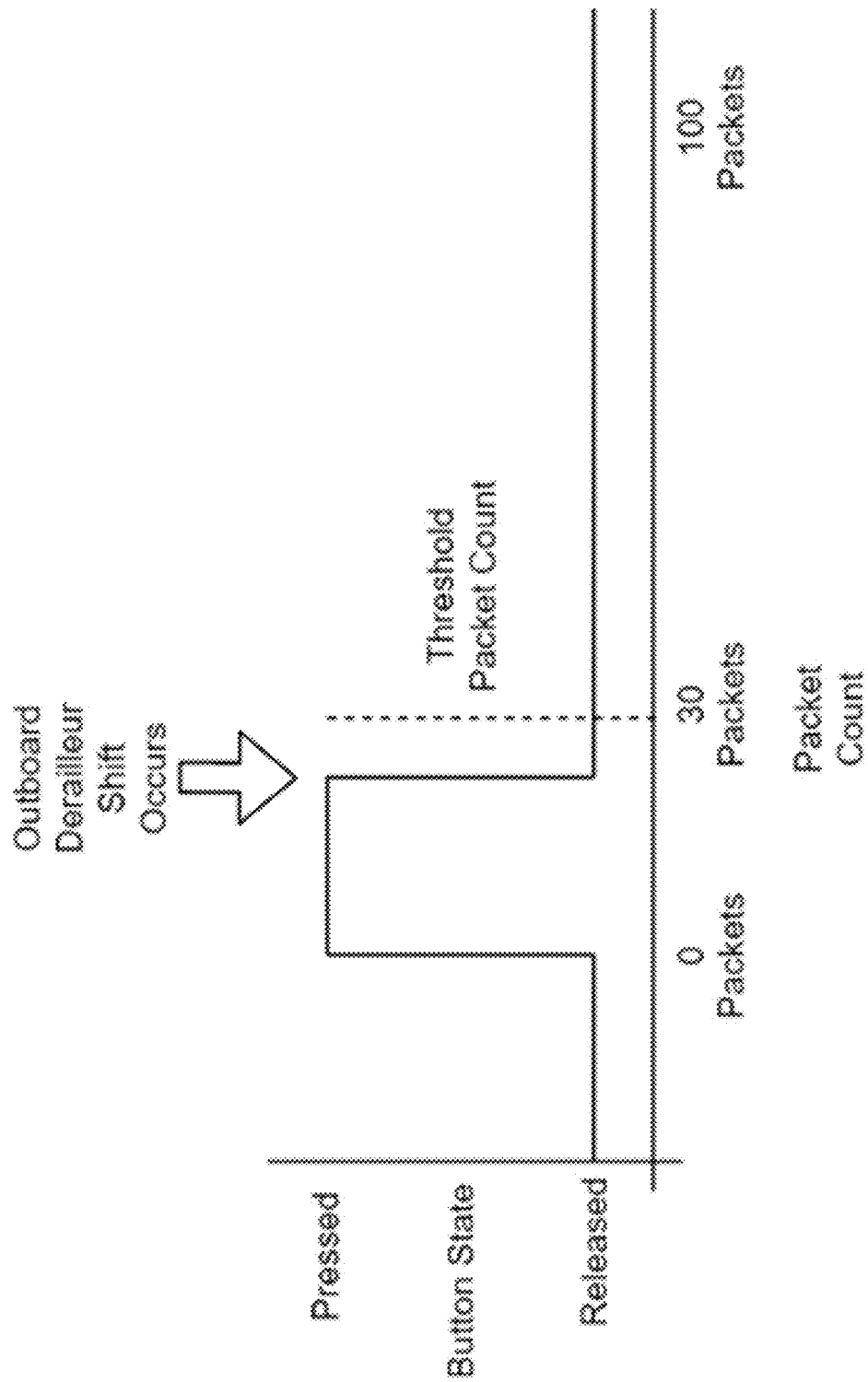
FIG. 9A is a plot of button state over number of packets generated and transmitted for a first example of an abbreviated button press.

FIG. 9A illustrates an example in which the predetermined threshold number of first packets is thirty, and the controller initiates, for example, the primary action (e.g., the shifting of the rear derailleur in the outboard direction) when the number of all first packets received by the controller is less than thirty packets (e.g., twenty five packets; the identified number of first packets received before the first second packed was received is less than the predetermined threshold number of first packets). In other words, FIG. 9A illustrates the initiation of another action when an abbreviated button press is identified. The other action may be initiated after the first second packet is received by the controller. Other predetermined threshold numbers of first packets, other actions, and/or other controlled bicycle components may be provided.

Figure 9B:
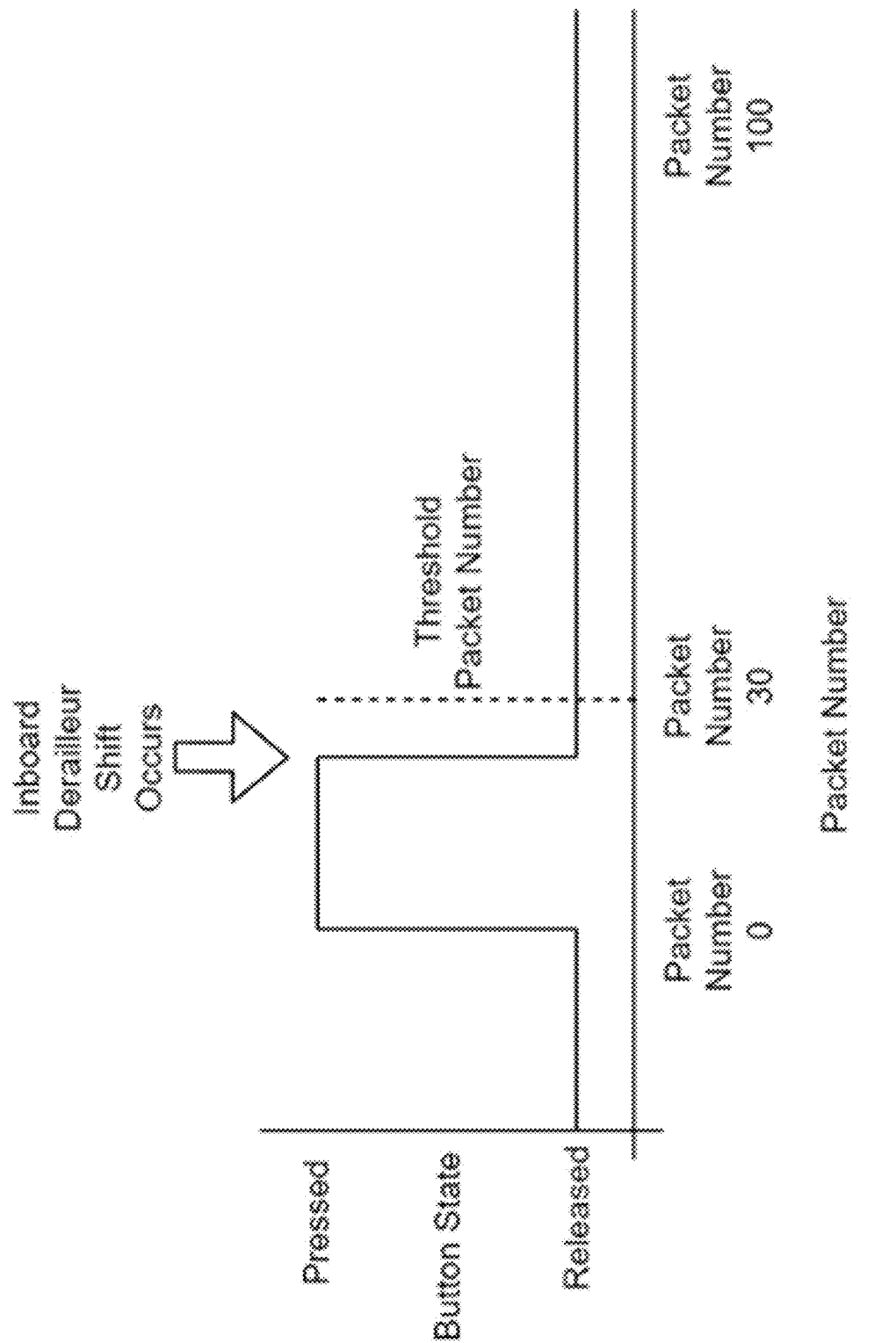
FIG. 9B is a plot of button state over number of packets generated and transmitted for a second example of an abbreviated button press.
Figure 9C:
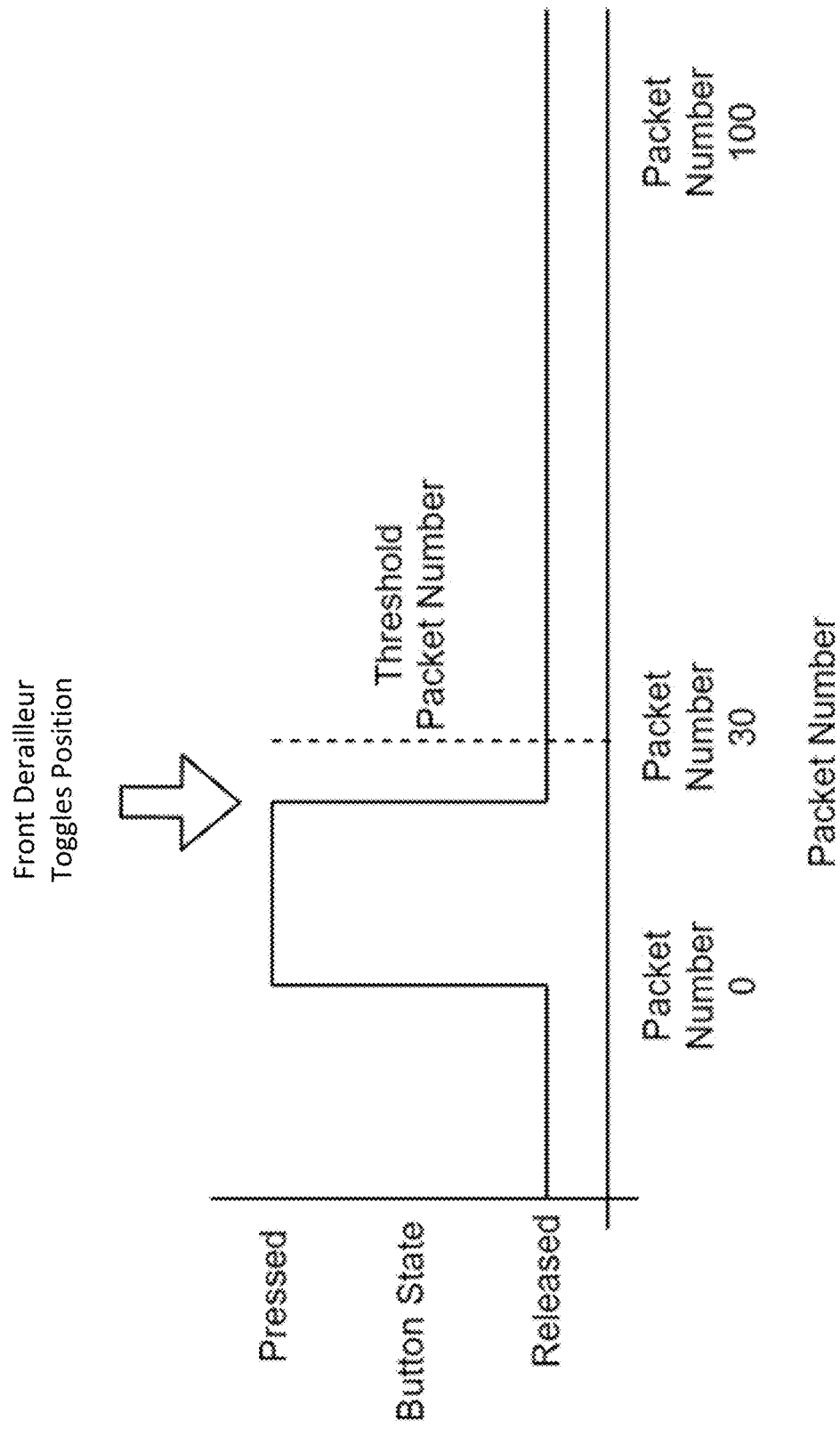
FIG. 9C is a plot of button state over number of packets generated and transmitted for a third example of an abbreviated button press.

For example, FIG. 9B illustrates an example, in which the predetermined threshold number of first packets is thirty, and the controller initiates the primary action (e.g., corresponding to the abbreviated button press) when the identified number of first packets is less than thirty packets. The primary action of the example shown in FIG. 9B is the shifting of the rear derailleur in the inboard direction. As another example, FIG. 9C illustrates an example, in which the primary action (e.g., corresponding to the abbreviated button press) is the toggling of a position of the front derailleur.

In act 418, when the received second packet is not the first second packet (e.g., the first second packet after the button is released), the controller compares the number of received second packets, which is identified in act 414, to the predetermined number of second packets. The predetermined number of second packets may be stored in the memory of the controller. The predetermined number of second packets may be set and stored in the memory of the controller at manufacture of the controller, the component that includes the controller (e.g., the rear derailleur), or the bicycle, and/or may be set and stored by the rider. In the example shown in FIG. 5, the predetermined number of second packets is "9", but other predetermined numbers of second packets may be used.

In act 422, the controller determines, based on the comparison in act 418, whether the identified number of received second packets is equal to the predetermined number of second packets. If the identified number of received second packets is equal to the predetermined number of second packets, the method 400 ends at act 424. If the identified number of received second packets is less than the predetermined number of second packets, the method 400 returns to act 402 for the receipt of an additional packet of the data stream. The method 400 may continue for multiple cycles of button press/button release if the button is pressed each time before the predetermined number of second packets is received.

In one embodiment, the control device generates and/or transmits packets irregularly (e.g., non-periodically). The control device may generate and/or transmit first packets irregularly for any number of reasons. For example, the control device may generate and/or transmit first packets irregularly for security purposes or because the control device senses similar devices in the area, and the control device randomizes generation and/or transmission of the first packets to minimize interference. Further, wireless communication of packets is not guaranteed, so the controller may receive less than all of the packets transmitted by the control device.

The control device may transmit less than all of the first packets generated for a button press, for example, and/or the controller may receive less than all of the first packets transmitted for the button press. In one embodiment, the control device generates and transmits packets non-periodically, but the generated packets include packet number data that corresponds to regularly generated packets. For example, during a button press, the control device may generate and transmit a single first packet; instead of including data indicating packet number "0", the control device may track how many first packets would have been generated regularly and include data indicating this packet number (e.g., packet number data). More than one first packet may be generated and transmitted by the control device for each button press in such an irregular packet generation embodiment.

The controller may identify whether the respective button press is an extended button press or an abbreviated button press based on the packet number data (e.g., an index number) of a received first packet, and initiate the primary action or the secondary action based on the identification. For example, if the predetermined threshold number of first packets is 30 packets, and the controller receives a single first packet during a first button press with packet number data indicating the single first packet is packet number 30 or packet number 35, the controller may initiate the secondary action corresponding to the extended button press. In one embodiment, during an extended button press, the control device may generate and transmit additional first packets, and the controller repeats the secondary action if the packet number data is greater than or equal to a next multiple of the threshold number of first packets (e.g., packet number 60, a second multiple of the predetermined threshold number of first packets). If the controller receives a single first packet during the first button press with packet number data indicating the single first packet is, for example, packet number 10, the controller may initiate the primary action corresponding to the abbreviated button press if the controller thereafter receives a second packet, which may indicate the button press has been released (e.g., with verification). This may be applied for each of the embodiments described above.

In one embodiment, the controller identifies one or more predetermined ranges of packet numbers. A predetermined range of packet numbers may correspond to an action (e.g., the secondary action). For example, the predetermined range of packet numbers may be 30-60, though other ranges of packet numbers may be used. The controller may compare the packet number data of a received first packet to the predetermined range and initiate the corresponding action the first time the packet number data is within the predetermined range of packet numbers.

For each button on a bicycle, a reaction for an abbreviated press of the respective button (e.g., a first reaction) and a reaction for an extended press of the respective button (e.g., a second reaction) may be defined and stored. For example, the first reaction and the second reaction may be defined for each button on the bicycle within a computer or mobile device application, and transmitted to the controller or another controller of the bicycle for storage at a memory of the respective controller. The controller, for example, may identify an action for a particular button press (e.g., a particular button press of a particular button) based on the stored reactions.

Table 1 illustrates exemplary combinations of reactions for an abbreviated button press and an extended button press, respectively, of a respective button that may be defined and stored at the controller, for example.

TABLE 1

| | | EXTENDED | | | | | | | | automatic shifting increase cadence setpoint | automatic shifting decrease cadence setpoint | automatic shifting toggle automatic enable | automatic shifing enable | automatic shifting disable | ebike next assist mode | ebike previous assist mode | no function |
|---|---|---|---|---|---|---|---|---|---|---|---|---|---|---|---|---|---|
| | | rear derailleur inboard shift | rear derailleur outboard shift | front derailleur inboard shift | front derailleur outboard shift | front derailleur toggle position | suspension damper lock | suspension damper open | suspension damper intermediate position | | | | | | | | |
| ABBREVIATED | rear derailleur inboard shift | | x | x | x | x | x | x | x | x | x | x | x | x | x | x | x |
| | rear derailleur outboard shift | x | | x | x | x | x | x | x | x | x | x | x | x | x | x | x |
| | front derailleur inboard shift | x | x | | x | x | x | x | x | x | x | x | x | x | x | x | x |
| | front derailleur outboard shift | x | x | x | | x | x | x | x | x | x | x | x | x | x | x | x |
| | front derailleur toggle position | x | x | x | x | | x | x | x | x | x | x | x | x | x | x | x |
| | suspension damper lock | x | x | x | x | x | | x | x | x | x | x | x | x | x | x | x |
| | suspension damper open | x | x | x | x | x | x | | x | x | x | x | x | x | x | x | x |
| | suspension damper intermediate position | x | x | x | x | x | x | x | | x | x | x | x | x | x | x | x |
| | automatic shifting increase cadence setpoint | x | x | x | x | x | x | x | x | | x | x | x | x | x | x | x |
| | automatic shifting decrease cadence setpoint | x | x | x | x | x | x | x | x | x | | x | x | x | x | x | x |
| | automatic shifting toggle automatic enable | x | x | x | x | x | x | x | x | x | x | | x | x | x | x | x |
| | automatic shifting enable | x | x | x | x | x | x | x | x | x | x | x | | x | x | x | x |
| | automatic shifting disable | x | x | x | x | x | x | x | x | x | x | x | x | | x | x | x |
| | ebike next assist mode | x | x | x | x | x | x | x | x | x | x | x | x | x | | x | x |
| | ebike previous assist mode | x | x | x | x | x | x | x | x | x | x | x | x | x | x | | x |

In one embodiment, the first reaction or the second reaction for the respective button on the bicycle is that no action is taken. For example, as shown in the rightmost column of Table 1, no function may be executed in response to the extended press of the respective button. Other combinations may be provided.

Table 2 illustrates exemplary combinations of reactions for an abbreviated button press and an extended button press and hold, respectively, of a respective button that may be defined and stored at the controller, for example.

TABLE 2

| | | EXTENDED and HOLD | | | | |
|---|---|---|---|---|---|---|
| | | multishift | seatpost control | ebike walk mode | ebike overbooster | no function |
| ABBREVIATED | rear derailleur inboard shift | x | x | x | x | x |
| | rear derailleur outboard shift | x | x | x | x | x |
| | front derailleur inboard shift | x | x | x | x | x |
| | front derailleur outboard shift | x | x | x | x | x |
| | front derailleur toggle position | x | x | x | x | x |
| | suspension damper lock | x | x | x | x | x |
| | suspension damper open | x | x | x | x | x |
| | suspension damper intermediate position | x | x | x | x | x |
| | automatic shifting increase cadence setpoint | x | x | x | x | x |
| | automatic shifting decrease cadence setpoint | x | x | x | x | x |
| | automatic shifting toggle automatic enable | x | x | x | x | x |
| | automatic shifting enable | x | x | x | x | x |
| | automatic shifting disable | x | x | x | x | x |
| | ebike next assist mode | x | x | x | x | x |
| | ebike previous assist mode | x | x | x | x | x |

Other control configurations may be provided. For example, in order for the rider not to have to perform an extended press for the full duration for each secondary action (see act 412 of the method 400), the controller may implement a repeat feature, in which, after a first extended press of the button (e.g., as defined by the predetermined threshold number of first packets), each subsequent press of the button that occurs within a predetermined threshold time or a predetermined number of packets after a previous press of the button also initiates the secondary action.

Referring to FIG. 10, the secondary action (e.g., inboard shift of the rear derailleur) is first initiated when the predetermined threshold number of first packets is received (e.g., corresponding to 120 ms in FIG. 10) during the first button press. Once the first button press is released (e.g., as indicated by the receipt of a first second packet during the first button release), the controller identifies a time (e.g., counts) or a number of packets (e.g., a number of second packets) received between an end of the first button press (e.g., a time of a last received first packet of the first button press or a first received second packet of the first button release) and a beginning of a second button press (e.g., as indicated by receipt of a first data packet). The controller compares the identified time to the predetermined threshold time (e.g., 100 ms) or compares the identified number of packets to the predetermined number of packets and repeats the secondary action after a first packet for the second button press is received. This may be repeated any number of times. In the example shown in FIG. 10, the secondary action is initiated twice; the repeat feature is exited before the third button press, as the third button press occurs after the predetermined threshold time relative to the second button press. The third button press initiates the primary action, as the number of the first packets received by the controller during the third button press is less than the predetermined threshold number of first packets.

As another example, the controller may initiate the secondary action based on a double click of the button. The controller may initiate the primary action after a first button press, during which a corresponding number of first packets are received by the controller, and, for example, the predetermined number of second packets are received by the controller during a first button release. If, during the first button release, before all second packets of the predetermined number of second packets are received by the controller, the button is pressed again, the first controller again receives first packets during a second button press, and a double click of the button is identified. In one embodiment, the double click of the button is identified by the controller when the button is pressed a second time before a double click threshold number of second packets is received by the controller. The double click threshold number of second packets (e.g., four packets) may, for example, be less than the predetermined number of second packets (e.g., five packets).

Figure 11:
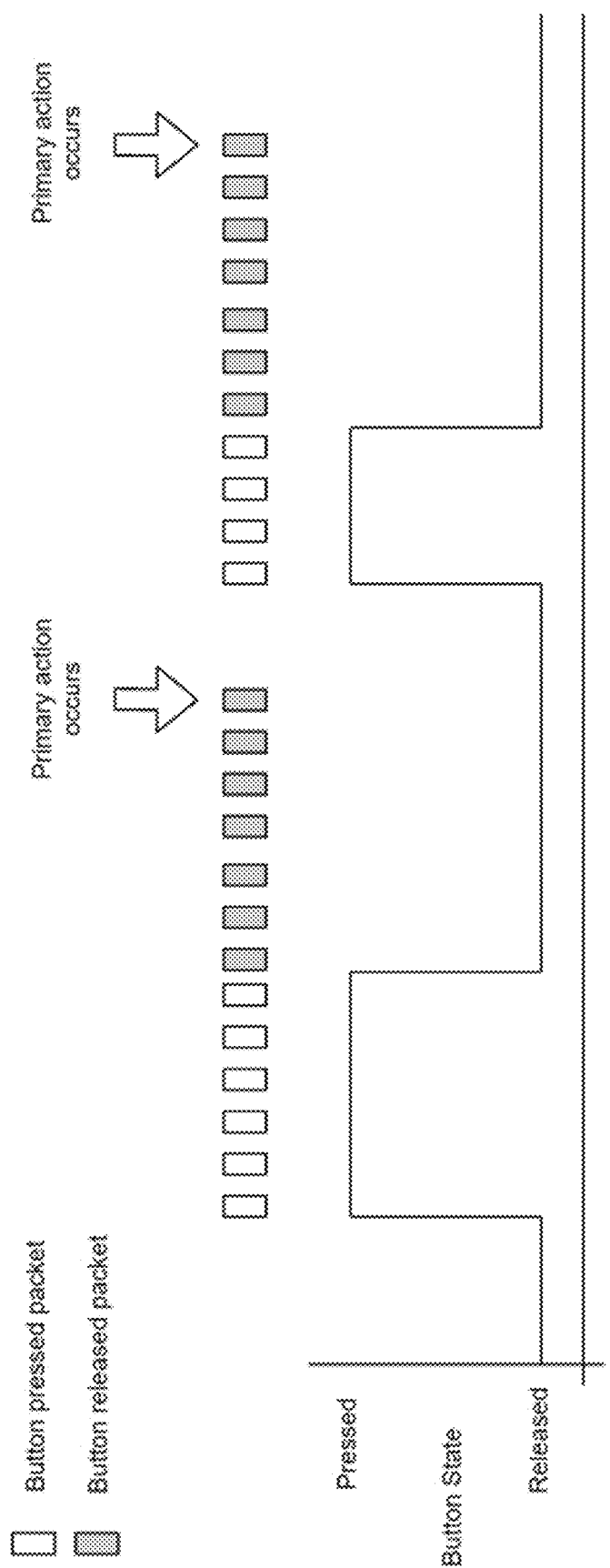
FIG. 11 is a plot of button state over number of packets generated and transmitted for an example of a single click button press.
Figure 12:
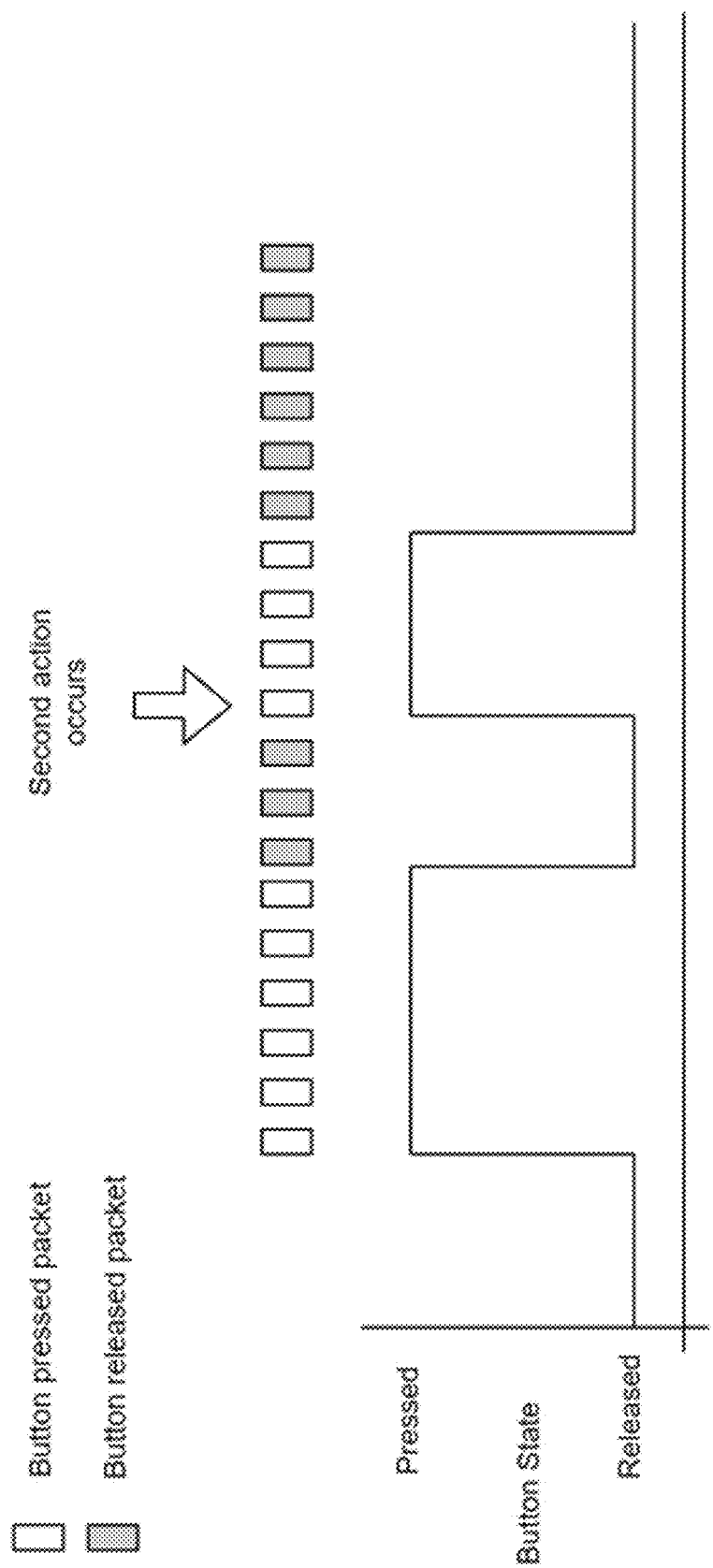
FIG. 12 is a plot of button state over number of packets generated and transmitted for an example of a double click button press.

Referring to FIG. 11, the controller initiates the primary action after the predetermined number of second packets is received by the controller. In other words, the controller initiates the primary action in response to single clicks of the button. Referring to FIG. 12, the controller initiates the secondary action when first packets are received again before all second packets of the predetermined number of second packets are received by the controller. In other words, the controller initiates the secondary action in response to a double click of the button.

Figure 13:
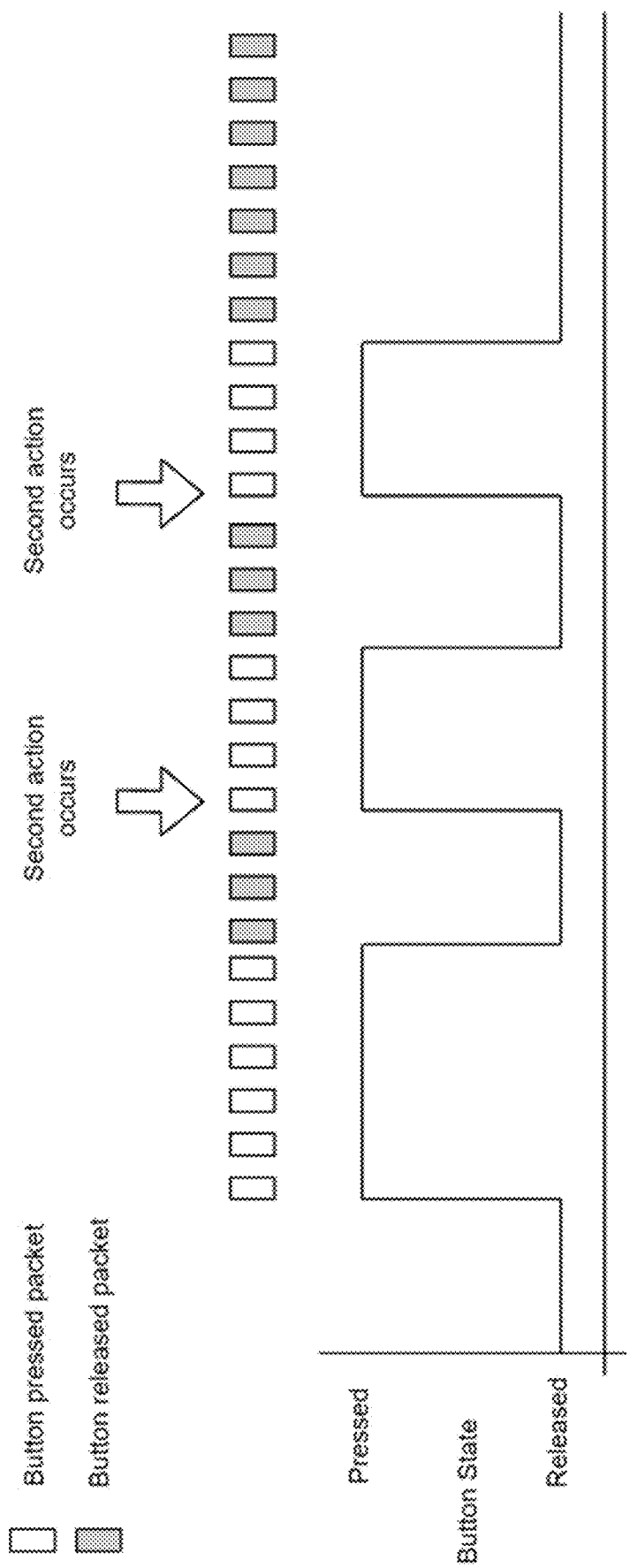
FIG. 13 is a plot of button state over number of packets generated and transmitted for an example double click repeat button press.

As yet another example, the controller may repeat the secondary action based on a double click repeat. For example, if a double click has been detected, subsequent presses of the button that fall within, for example, the double click threshold number of second packets may initiate secondary actions. Referring to FIG. 13, the controller initiates the secondary action a first time when first packets are received before all second packets of the double click threshold number of second packets during the first button release are received by the controller. The controller initiates the secondary action a second time when first packets are received before all second packets of the double click threshold number of second packets during the second button release are received by the controller. More secondary actions may be initiated with such button presses.

Figure 14:
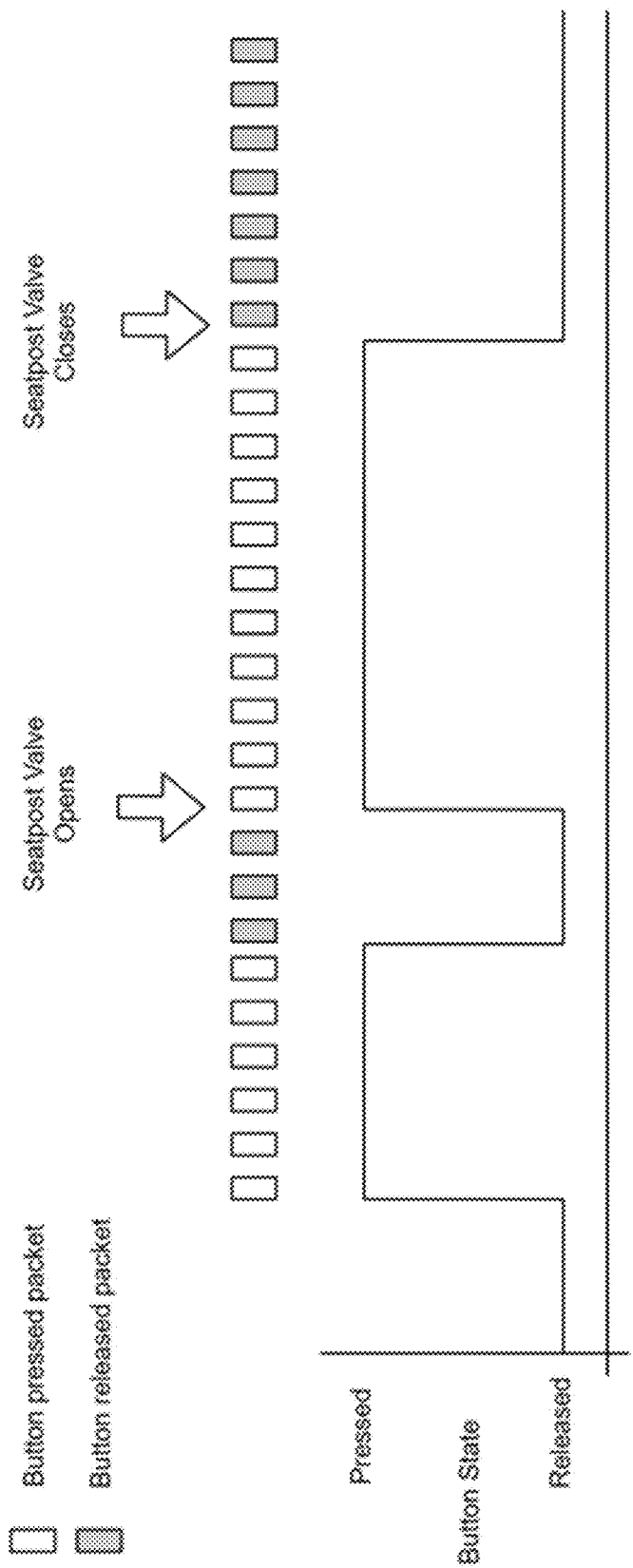
FIG. 14 is a plot of button state over number of packets generated and transmitted for an example double click and hold button press.

As another example, if the secondary action has an extended press behavior, the second button press of a double click may initiate the e press behavior as expected. For example, referring to FIG. 14, the controller may initiate a primary action (e.g., opening the valve of the seat post assembly) when the controller identifies the double click, and may initiate a secondary action (e.g., closing the valve of the seat post assembly) after the character of an identified extended press of the button. For example, when the controller identifies the second button press is an extended press, the controller may initiate the secondary action after the second button press is released (e.g., as indicated by the receipt of a second packet).

The embodiments described above with reference to FIGS. 5-14 may be executed by the controller using time instead of number of packets. For example, the predetermined threshold amount of time may be 200 ms; the abbreviated button press may be identified when the button press is less than 200 ms, and the extended button press may be identified when the button press is greater than or equal to 200 ms. Other predetermined threshold amounts of time may be used.

Figure 15:
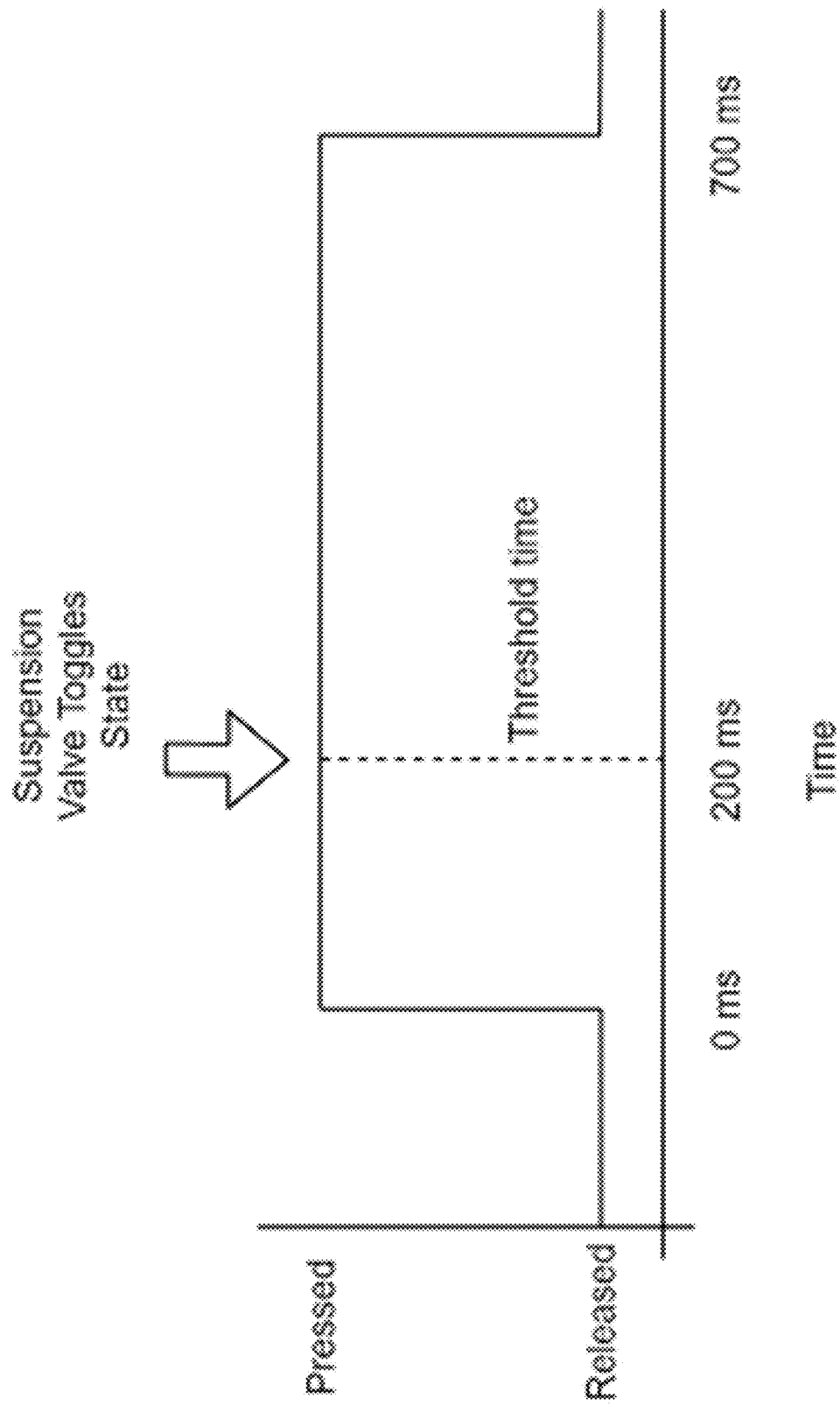
FIG. 15 is a plot of button state over time for an example of an extended button press.

In one embodiment, as shown in FIG. 15, the secondary action is the toggling of a state of a valve of a suspension system (e.g., the front suspension system 230 or the rear suspension system 232). When the controller determines, based on the signal received from the control device, that the button has been pressed for the predetermined threshold amount of time (e.g., 200 ms), the controller initiates the toggling of the state of the valve of the suspension system. The primary action (e.g., corresponding to an abbreviated button press, such as less than 200 ms) in such a configuration may be any number of actions including, for example, the shifting of a rear derailleur (e.g., in the inboard direction or the outboard direction). Such control of the suspension system with the extended button press and the rear derailleur with the abbreviated button press may be executed with packet counting, as described above with reference to FIGS. 5-14, instead of the counting of time.

In accordance with various embodiments of the present disclosure, the methods described herein may be implemented with software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The methods and techniques described herein may be implemented using hardware configurations described herein and one or more computer programs providing instructions for the hardware. A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows may also be performed by, and the apparatus may also be implemented as, special purpose logic circuitry (e.g., a field programmable gate array (FPGA) or an application specific integrated circuit (ASIC)).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile computing device or a similar integrated circuit in server, a cellular network device, or other network device.

Processors suitable for the execution of a computer program include, by way of example, both general and special purpose microprocessors, and any one or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant ("PDA"), a mobile audio player, a Global Positioning System ("GPS") receiver, or a system control device 150 to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. In an embodiment, a system control device is integrated with a mobile telephone, PDA, a mobile audio player, a GPS receiver, and communicates wirelessly with bicycle components to provide automatic mode control.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. An electrically actuated component of a bicycle, the electrically actuated component comprising:
   a first controller configured to:
   receive a data stream from a second controller, the data stream including one or more packets received by the first controller;
   for each of the one or more packets received by the first controller:
   identify a number of the one or more packets of the data stream received by the first controller;
   compare the identified number of packets to a predetermined threshold number of packets; and
   after all packets of the one or more packets of the data stream have been received by the first controller, initiate, based on the respective comparison, an action of the electrically actuated component or another electrically actuated component of the bicycle when the identified number of packets is less than the predetermined threshold number of packets.

2. The electrically actuated component of claim 1, wherein the one or more packets are one or more first packets, and
   wherein the data stream further includes one or more second packets received by the first controller periodically, after the one or more first packets.

3. The electrically actuated component of claim 2, wherein the one or more first packets are a first type of packets generated by the second controller in response to actuation of a control device of the bicycle, and the one or more second packets are a second type of packets generated by the second controller after the control device is released, the first type of packets being different than the second type of packets in that the first type of packets includes data that identifies the control device actuation and the second type of packets includes data that identifies the control device release.

4. The electrically actuated component of claim 2, wherein the initiation of the action comprises initiation of the action of the electrically actuated component or the other electrically actuated component after a second packet of the one or more second packets is received by the first controller.

5. The electrically actuated component of claim 2, wherein the electrically actuated component is a rear derailleur.

6. The electrically actuated component of claim 5, further comprising a motor in communication with the first controller,
wherein the initiation of the action comprises actuation of the motor, such that the rear derailleur executes a first gear shift in one direction of an outboard direction and an inboard direction.

7. The electrically actuated component of claim 6, wherein the other electrically actuated component is a first other electrically actuated component, and the action is a first action of the electrically actuated component or a first action of the first other electrically actuated component, and
wherein the first controller is further configured to initiate, based on the respective comparison, a second action when the identified number of packets is equal to the predetermined threshold number of packets, the second action being a second action of the electrically actuated component, a second action of the first other electrically actuated component, or a first action of a second other electrically actuated component.

8. The electrically actuated component of claim 7, wherein the initiation of the second action comprises actuation of the motor, such that the rear derailleur executes a second gear shift, the second gear shift being in the other direction of the outboard direction and the inboard direction.

9. The electrically actuated component of claim 8, wherein the first controller is further configured to actuate, based on the respective comparison, the motor when the identified number of packets is equal to a second multiple of the predetermined threshold number of packets, such that the rear derailleur executes a third gear shift, the third gear shift being in the other direction.

10. The electrically actuated component of claim 7, wherein the first other electrically actuated component is a front derailleur, and
wherein the initiation of the second action comprises actuation of a motor of the front derailleur, such that the front derailleur shifts chainrings of the bicycle.

11. The electrically actuated component of claim 7, wherein the first other electrically actuated component is a seat post assembly of the bicycle, and
wherein the initiation of the second action comprises actuation of a valve of the seat post assembly, such that the valve opens and a height of a seat post of the seat post assembly is changeable.

12. The electrically actuated component of claim 11, wherein the first controller is further configured to close the valve of the seat post assembly after a second packet of the one or more second packets is received by the first controller.

13. The electrically actuated component of claim 7, wherein the first other electrically actuated component is a suspension assembly of the bicycle, and
wherein the initiation of the second action comprises actuation of a damper of the suspension assembly, such that a rigidity of the suspension assembly is changed.

14. The electrically actuated component of claim 1, wherein:
the identification of the number of the one or more packets of the data stream received by the first controller comprises identification of the number of the one or more packets of the data stream received by the first controller within data of the respective packet;
the first controller is further configured to count each of the one or more packets of the data stream as the one or more packets are received by the first controller, and the identification of the number of the one or more packets of the data stream received by the first controller comprises identification of the number of the one or more packets of the data stream received by the first controller based on the count; or
a combination thereof.

15. A method for controlling one or more electronic components of a bicycle, the method comprising:
receiving, by a controller of the bicycle, a packet of a data stream;
identifying, by the controller, a number of packets of the data stream received by the controller;
comparing, by the controller, the identified number of packets to a predetermined threshold number of packets;
repeating, by the controller, the receiving, the identifying, and the comparing one or more times, the repeating comprising repeating the receiving, the identifying, and the comparing until all the packets of the data stream have been received by the controller; and
after all of the packets of the data stream have been received by the controller, controlling, by the controller, based on the respective comparing, an electronic component of the one or more electronic components of the bicycle when the identified number of packets is less than the predetermined threshold number of packets, such that a first action of the electronic component is executed.

16. The method of claim 15, wherein the electronic component is a first electronic component, and
wherein the method further comprises:
controlling, based on the respective comparing, the first electronic component when the identified number of packets equals the predetermined threshold number of packets, such that a second action of the first electronic component is executed; or
controlling, based on the respective comparing, a second electronic component of the one or more electronic components of the bicycle when the identified number of packets equals the predetermined threshold number of packets, such that a first action of the second electronic component is executed.

17. The method of claim 16, wherein the packets are first packets, each of the first packets being a first type of packet that identifies actuation of a control device of the bicycle,
wherein the method further comprises receiving, by the controller, one or more second packets of the data stream after all of the first packets have been received by the first controller, each of the second packets being a second type of packet that identifies release of the control device,
wherein receiving the one or more second packets of the data stream comprises:
receiving a predetermined number of second packets; or
receiving a number of second packets less than the predetermined number of second packets, and
wherein when the number of second packets less than the predetermined number of second packets is received, the method further comprises receiving third packets after all of the second packets have been received, each of the third packets being the first type of packet.

18. The method of claim 17, wherein when the controller receives the number of second packets less than the predetermined number of second packets and receives the third packets, the method further comprises:
   determining, by the controller, a time between a last received first packet of the first packets and a first received third packet of the third packets;
   comparing, by the controller, the determined time to a predetermined threshold time; and
   controlling, based on the comparing of the determined time to the predetermined threshold time, the second electronic component when the determined time is less than the predetermined threshold time, such that the first action of the second electronic component is repeated.

19. The method of claim 16, wherein the electronic component is a first electronic component, and
   wherein the method further comprises:
      for each of the one or more second packets:
         identifying, by the controller, a number of second packets of the data stream received by the controller; and
         comparing, by the controller, the identified number of second packets to the predetermined number of second packets; and
      after all second packets of the one or more second packets have been received by the controller, controlling, by the controller, based on the respective comparing of the identified number of second packets to the predetermined number of second packets, a second electronic component of the one or more electronic components of the bicycle when the identified number of second packets is less than the predetermined number of second packets, such that a first action of the second electronic component is executed.

20. A non-transitory computer-readable storage medium that stores instructions executable by one or more processors to control one or more electronic components of a bicycle, the instructions comprising:
   receiving a packet of a data stream;
   identifying a number of packets of the data stream received by the controller;
   comparing the identified number of packets to a predetermined threshold number of packets;
   repeating the receiving, the identifying, and the comparing one or more times, the repeating comprising repeating the receiving, the identifying, and the comparing until all the packets of the data stream have been received; and
   after all of the packets of the data stream have been received, controlling, based on the respective comparing, an electronic component of the one or more electronic components of the bicycle when the identified number of packets is less than the predetermined threshold number of packets, such that a first action of the electronic component is executed.

* * * * *